United States Patent [19]
Bott et al.

[11] Patent Number: 5,694,408
[45] Date of Patent: Dec. 2, 1997

[54] FIBER OPTIC LASER SYSTEM AND ASSOCIATED LASING METHOD

[75] Inventors: Eric H. Bott; Robert R. Rice, both of Chesterfield; Mark S. Zediker, Florissant, all of Mo.

[73] Assignee: McDonnell Douglas Corporation, St. Louis, Mo.

[21] Appl. No.: 611,474

[22] Filed: Mar. 5, 1996

Related U.S. Application Data

[63] Continuation-in-part of Ser. No. 471,870, Jun. 7, 1995.

[51] Int. Cl.$^6$ ........................................................ H01S 3/30
[52] U.S. Cl. ........................... 372/6; 372/31; 372/26; 372/108; 372/92; 372/98
[58] Field of Search ............................ 372/92, 98, 6, 372/56, 108, 69, 54, 26

[56] References Cited

U.S. PATENT DOCUMENTS

| | | | |
|---|---|---|---|
| 4,933,949 | 6/1990 | Johnson | 372/53 |
| 5,121,400 | 6/1992 | Verdiell et al. | |
| 5,355,387 | 10/1994 | English, Jr. | 372/54 |

FOREIGN PATENT DOCUMENTS 0 571 126 A2  11/1993  European Pat. Off. .

OTHER PUBLICATIONS

M.F. Digonnet, et al., Theoretical analysis of optical fiber laser amplifiers and oscillators, *Applied Optics*, vol. 24, No. 3, Feb. 1985, pp. 333–342.

E. Desurvire, Analysis of Erbium Doped Fiber Amplifiers Pumped in the 4¦15/2–4¦13/2 Band, *IEEE Photonics Technology Letters*, vol. 1, No. 10, Oct. 1989, pp. 293–296.

P.R. Morkel, et al., Theoretical modeling of eribum–doped fiber amplifiers with excited state absorption, *Optics Letters*, vol. 14, No. 19, Oct. 1989, pp. 1062–1065.

M.J.F. Digonnet, et al., Characterization and Optimization of the Grain in Nd–Doped Single–Mode Fibers, *IEEE Journal of Quantum Electronics*, vol. 26, No. 6, Jun. 1990, pp. 1105–1109.

R.I. Laming, et al., Noise Characteristics of Erbium–Doped Fiber Amplifier Pumped at 980 nm, *IEEE Photonics Technology Letters*, vol. 2, No. 6, Jun. 1990, pp. 418–421.

M.L. Dakss, et al., Fundamental Limits on Nd3 +–Doped Fiber Amplifier Performance at 1.3 μm, *IEEE Photonics Technology Letters*, vol. 2, No. 9, Sep. 1990, pp. 650–652.

R.I. Laming, et al., High–Power Erbium–Fiber Amplifiers Operating in the Saturated Regime, *IEEE Photonics Technology Letters*, vol. 3, No. 3, Mar. 1991, pp. 253–255.

I.N. Duling, et al., Output Characteristics of Diode Pumped Fiber ASE Sources, *IEEE Journal of Quantum Electronics*, vol. 27, No. 4, Apr. 1991, pp. 995–1003.

(List continued on next page.)

*Primary Examiner*—Leon Scott, Jr.
*Attorney, Agent, or Firm*—Bell, Seltzer, Park & Gibson, P.A.

[57] ABSTRACT

The fiber optic laser system and associated lasing method amplifies and divides a primary laser signal into a plurality of secondary laser signals. The fiber optic laser system includes a distribution means, such as a distribution module, for dividing a primary laser signal, generated by a master oscillator into a number of secondary laser signals. The distribution module can include amplification means, such as an optical fiber amplifier, for amplifying the primary laser signal and a signal power splitter for dividing the amplified primary laser signal into a number of secondary laser signals. The secondary laser signals can then be further amplified, such as by a power amplification module including another optical fiber amplifier. The secondary laser signals can be recombined to produce a laser output having a power level greater than the predetermined power level of the primary laser signal. During the process of combining the secondary laser signals, the secondary laser signals can be collimated and the relative phases of the secondary laser signals can be controllably modulated such that the resulting laser output has a predetermined phase profile and relatively high beam qualities.

65 Claims, 9 Drawing Sheets

OTHER PUBLICATIONS

T. Rasmussen, et al., Optimum Design of Nd–Doped Fiber Optical Amplifiers, *IEEE Photonics Technology Letters*, vol. 4, No. 1, Jan. 1992, pp. 49–51.

S. Zemon, et al., Excited State Absorption Cross Sections and Amplifier Modeling in the 1300–nm Region for Nd–Doped Glasses, *IEEE Photonics Technology Letters*, vol. 4, No. 3, Mar. 1992, pp. 244–247.

E. Desurvire, Analysis of Gain Difference Between Forward– and Backward–Pumped Erbium–Doped Fiber Amplifiers in the Satruation Regime, *IEEE Photonics Technology Letters*, vol. 4, No. 7, Jul. 1992, pp. 711–714.

J.D. Cao, et al., Five Watt Single Transverse Mode Neodymium Fiber Laser, *CLEO '93*, 1993, pp. 622–623.

S. Bedö, et al., The effective absorption coefficient in double–clad fibers, *Optics Communications* 99, 1993, pp. 331–335.

B. Dussardier, et al., Simultaneous Measurements of Lifetime, Gain and Emission Cross Section in a Neodymium–Doped Fiber, *IEEE Photonics Technology Letters*, vol. 4, No. 4, Apr. 1993, pp. 419–421.

L. Zenteno, High Power Double–Clad Fiber Lasers, *Journal of Lightwave Technology*, vol. 11, No. 9, Sep. 1993, pp. 1435–1446.

M.S. Salisbury, et al., Sensitivity improvement of a 1–µm ladar system incorporating an optical fiber preamplifier, *Optical Engineering*, vol. 32, No. 11, Nov. 1993, pp. 2671–2680.

M.J.F. Digonnet, et al., Rate Equations for Clusters in Rare Earth–Doped Fibers, *Optical Fiber Technology*, vol. 1, copyright 1994.

M.P. Petrov, et al., Gain saturation in three– and four–level fiber amplifiers, *Optics Communications* 109, 1994, pp. 499–506.

M. Karasek, Optimum design of Er3 + doped fluoride fiber amplifiers pumped at 820 nm and 1480 nm, *IEE Proc.–Optoelectron*, vol. 141, No. 3, Jun. 1994, pp. 167–172.

K.H. No, et al., One Dimensional Scaling of 100 Ridge Waveguide Amplifiers, *IEEE Photonics Technology Letters*, vol. 6, No. 9, Sep. 1994, pp. 1062–1066.

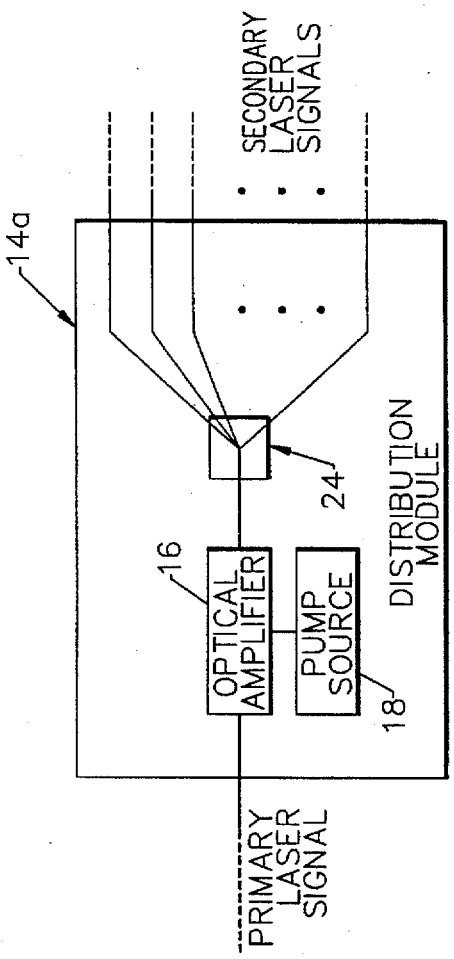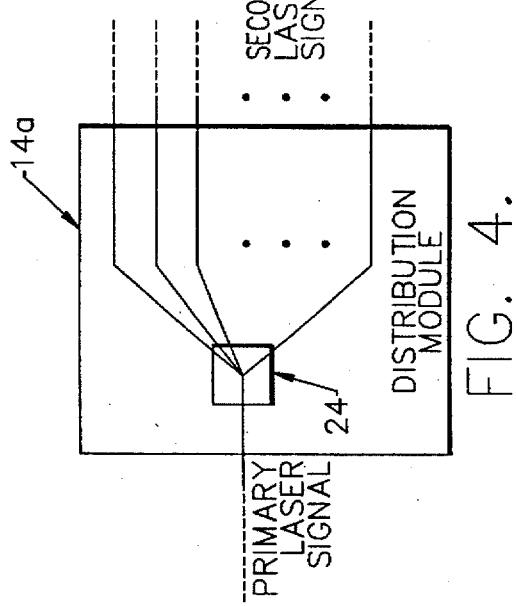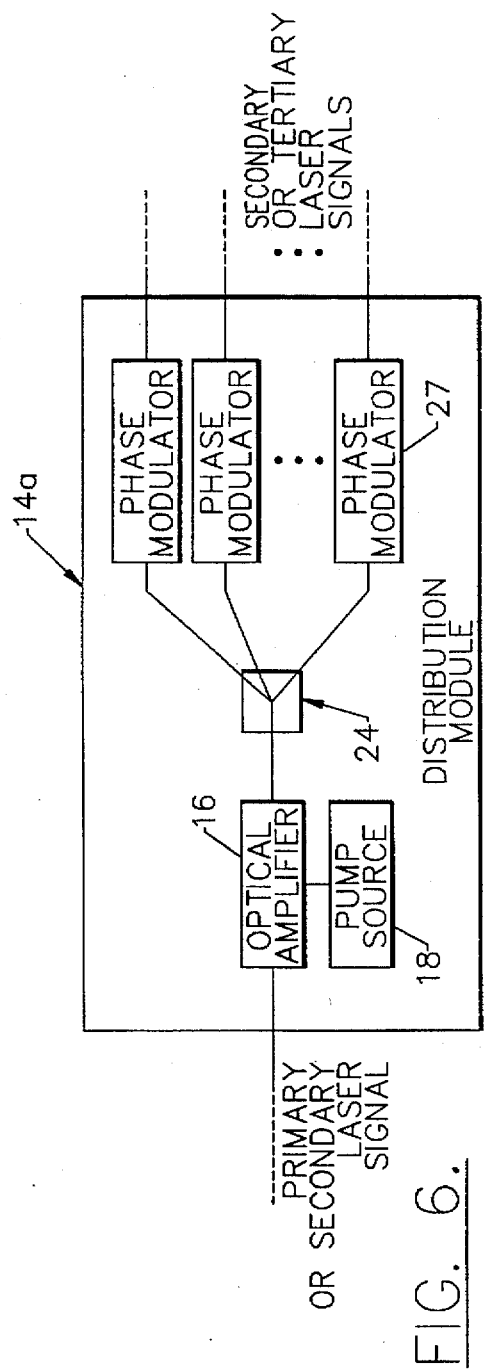
FIG. 4.
FIG. 5.
FIG. 6.

FIBER OPTIC LASER SYSTEM AND ASSOCIATED LASING METHOD

RELATED APPLICATION

This application is a continuation-in-part of U.S. patent application Ser. No. 08/471,870, filed Jun. 7, 1995, the contents of which are expressly incorporated in their entirety herein.

FIELD OF THE INVENTION

The present invention relates generally to laser systems and associated lasing methods and, more particularly, to laser systems employing optical fiber amplifiers and associated lasing methods.

BACKGROUND OF THE INVENTION

Lasers are presently employed for a wide variety of applications. For example, lasers are employed to process materials, such as by cutting, welding, heat treating, drilling, trimming and coating materials. Lasers are also employed to strip paint, remove coatings, clean surfaces and provide laser markings. Lasers can also be directly applied, such as via single mode optical fibers, for a variety of medical and other applications.

Lasers are also increasingly employed in military applications, including laser weapon and laser ranging systems. Further, laser communication systems have been developed in which laser signals are transmitted, such as by erbium-doped fiber amplifiers, in a predetermined format, such as Differential Frequency Shift Keying. In one more specific application, lasers can produce plasma on an illuminated surface, such as a metallic, oxide, composite, liquid or gaseous surface. The production of plasmas on the illuminated surface can produce x-rays, such as the x-rays employed in x-ray lithography.

While lasers are presently employed in a wide variety of applications, only some of which are listed above, the numbers and variety of applications in which laser systems will be employed in the future are anticipated to increase. Accordingly, a number of different types of laser systems have been developed. These laser systems include gas lasers, solid state lasers, semiconductor lasers, dye lasers, eximer lasers and chemical lasers.

However, along with the ever increasing number of applications in which lasers are used, the demands on the laser systems are also ever increasing. For example, a number of applications, including military, materials processing, medical and communications applications, are demanding continuous wave lasers which emit increasingly higher power levels. In addition, a number of applications demand that the laser system produce an output beam which is of high quality, e.g., exhibiting predominantly or entirely fundamental or $TEM_{00}$ mode characteristics. Accordingly, the output beam can be more definitely focused to achieve higher brightness. At the same time, many applications require that the laser system produce an output beam which is adaptable or dynamically controllable. Accordingly, the output beam can be modulated to convey information or to produce a precisely controlled power or fluence level as demanded by the application.

As laser systems are employed in increasing numbers of applications, the laser systems must generally be relatively rugged, lightweight, capable of operating in different environmental conditions, maintainable and serviceable without incurring excessive costs or experiencing prolonged down time. In addition, the materials consumed or emitted by the laser are preferably non-hazardous and environmentally friendly. In addition, it is oftentimes desirable that a laser provide an output beam having a relatively high brightness and be amenable to a variety of modulation techniques, such as amplitude modulation, frequency modulation or phase modulation, to further increase the flexibility of the laser system. While a variety of laser systems have been developed in order to service one or more of the applications described above, few, if any, of the conventional laser systems offer each of the features described above while providing a high quality output beam having relatively high power.

SUMMARY OF THE INVENTION

It is therefore an object of the present invention to provide an improved laser system and associated amplification method.

It is another object of the present invention to provide an improved continuous wave laser system having a controllable output beam.

It is yet another object of the present invention to provide an improved laser system adapted to provide relatively high levels of output power.

It is a further object of the present invention to provide an adaptive or modular laser system which can be readily modified or scaled to meet the particular requirements of a specific application.

These and other objects are provided, according to one embodiment of the present invention, by a fiber optic laser system and an associated method for amplifying a primary laser signal, dividing the amplified primary laser signal into a plurality of secondary laser signals and recombining the secondary laser signals to produce a high brightness laser output having a power level greater than the predetermined power level of the primary laser signal. The plurality of secondary laser signals can also be individually amplified prior to their recombination.

Accordingly, the present invention provides a scalable laser architecture which enables the design and production of lasers with output powers from watts to megawatts, continuous wave operation, high beam quality including high brightness, ease of modulation of the output beam, and high electrical-to-optical operating efficiency, in any desired combination. In addition, the fiber optic laser and associated method of the present invention can efficiently produce a single mode laser output having relatively high brightness due, at least in part, to the amplification of the laser signals by an optical fiber amplifier which preferably preserves the spatial coherence of the laser beam.

The fiber optic laser system of the present invention includes a master oscillator for generating a primary laser signal having a predetermined wavelength and a predetermined power level. The master oscillator also preferably generates a primary laser signal having a predetermined wavefront and a predetermined linewidth. The master oscillator may include modulation means for modulating one or more predetermined characteristics of the primary laser signal, such as amplitude, phase or frequency. The modulation means can be responsive to external commands.

The fiber optic laser also includes amplification means, responsive to the primary laser signal, for amplifying the primary laser signal to produce a signal having a power level greater than the predetermined power of the primary laser signal. The fiber optic laser system also has a means for splitting and distributing the primary laser signal into a plurality of secondary laser signals. In one advantageous embodiment, the distribution means includes a signal power splitter and a plurality of optical waveguides for dividing the primary laser signal into a plurality of secondary laser signals. The distribution means can be constructed as a module and may include the amplification means for amplifying the laser signals. For example, the distribution module can include an optical amplifier, such as an optical fiber amplifier or an integrated active optic amplifier, for amplifying the primary laser signal.

The fiber optic laser system can also include means, such as secondary distribution modules, for amplifying and dividing one or more of the secondary laser signals into a plurality of tertiary laser signals. Accordingly, a fiber optic laser of the present invention provides for the controlled amplification and division of the primary laser signal such that the resulting power of the laser output can be adjusted or scaled to the requirements of a particular application.

According to one embodiment, the amplification means of the fiber optic laser can include means, such as an optical fiber amplifier, for further amplifying at least one of the secondary laser signals. According to one advantageous embodiment, the means for amplifying a secondary laser signal, such as an optical fiber amplifier, can be disposed within an amplification module which amplifies a respective secondary laser signal. By amplifying one or more of the secondary laser signals, the fiber optic laser system produces a laser output which has a power level greater than the predetermined power level of the primary laser signal.

The distribution means can include a pump source for pumping the optical fiber amplifier such that the primary laser signal is amplified. In this embodiment, the optical fiber amplifier is preferably an optical fiber having a core doped with one or more rare earth elements, such as ytterbium, neodymium, praseodymium, erbium, holmium and thulium. The distribution means can also include a monitor for individually detecting at least one of the plurality of secondary laser signals and the pump power injected by the pump source to thereby confirm that the distribution module and the pump source are operating properly.

The optical fiber amplifier of the power amplification module can be a dual core optical fiber. The dual core optical fiber has an inner core doped with one or more rare earth elements, such as ytterbium, neodymium, praseodymium, erbium, holmium or thulium, an outer core surrounding the inner core and a cladding layer surrounding the outer core. The power amplification module can also include at least one pump source for pumping the optical fiber amplifier. In one embodiment, the outer core of the dual core optical fiber has a predetermined cross-sectional size, shape and numerical aperture. According to this embodiment, the pump source can include a laser source adapted to emit a laser beam having a predetermined size, shape and numerical aperture which is advantageously matched to the predetermined cross-sectional size, shape and numerical aperture of the outer core. Accordingly, by matching the mode of the laser to the mode of the optical fiber, the efficiency with which the pump signals are coupled from the laser source to the outer core of the optical fiber amplifier is maximized.

In one embodiment, the power amplification module includes a plurality of distributed pump sources for pumping the optical fiber amplifier in a plurality of spaced-apart regions. In another embodiment, the optical fiber amplifier of the power amplification module includes first and second serially-connected optical fiber amplifiers. In this embodiment, the pump sources can be adapted to simultaneously pump both the first and second optical fiber amplifiers in the same, in the opposite, or in both the same and opposite directions relative to the direction in which the secondary laser signals are transmitted therethrough.

In another embodiment, the power amplification module can include first and second pump sources adapted to produce respective pump signals having first and second different polarization states, respectively. According to this embodiment, the power amplification module can also include a polarizing beam combiner for combining the respective pump signals of the first and second pump sources to produce a combined pump signal having a mixed polarization state, which is a combination of the first and second polarization states, and having a greater brightness than that of either pump signal individually.

Alternatively, the first and second pump sources can produce respective pump signals having first and second different wavelengths, respectively. In this embodiment, the power amplification module can include a dichroic beam combiner for combining the respective pump signals of the first and second pump sources to produce a combined pump signal having a mixed wavelength, comprising the first and second colors, and having a greater brightness than that of either pump signal individually.

In addition, the optical fiber amplifiers of either the power amplification module or the distribution module can incorporate one or more filters for selectively removing optical signals having wavelengths different than the predetermined wavelength of the primary laser signal. Accordingly, any optical signals spuriously generated by the optical fiber amplifiers via Raman Scattering and other non-linear effects at wavelengths other than that of the primary laser signal are attenuated, if not eliminated. The spuriously generated optical signals are preferably attenuated at predetermined intervals to prevent gain reduction of the primary laser signal.

The fiber optic laser system can also include beam combining means for combining the plurality of secondary laser signals into a single laser output beam having a power level greater than the predetermined power level of the primary laser signal. The beam combining means can include a plurality of lens elements, such as graded index lens elements, binary optic lens elements and surface refraction lens elements, for collimating respective ones of the plurality of secondary laser signals. The plurality of lens elements can also fill a predetermined aperture.

The beam combining means of one embodiment can also include means for controlling at least one predetermined characteristic of one or more of the plurality of secondary laser signals, such as amplitude and/or phase. For example, the beam combining means can include means for controlling the respective phases of each of the secondary laser signals. Accordingly, the beam combining means of this embodiment can produce a desired phase front across the face of the aperture, thereby enabling coherent combination of the plurality of secondary laser signals into a single, high quality, high power laser output beam. According to another embodiment, the beam combining means can control the amplitude of each of the secondary laser signals, such as by adjusting the gain of the respective laser amplification modules. Accordingly, the beam combining means of this embodiment can produce laser output beams of very high quality, while minimizing power lost to sidelobes in the far-field which are caused by diffraction effects in apertures the size of the predetermined aperture.

In order to control the respective phases of the secondary laser signals, the beam combining means can include a phase modulator array having a plurality of phase modulator elements, such as liquid crystal modulators, electro-optic phase modulators or in-line fiber optic phase modulators, to controllably adjust the phases of respective ones of the plurality of secondary laser signals. Alternatively, the distribution means can include a plurality of phase modulators to controllably adjust the phases of respective ones of the plurality of secondary laser signals in response to control signals from the beam combining means.

The beam combining means of one embodiment can also include a detector array having a plurality of detector elements for comparing a respective secondary laser signal to a reference signal having a predetermined phase. Further, the beam combining means can include phase control means for providing phase control signals to the phase modulator array or to the plurality of phase modulators of the distribution means. The plurality of phase modulators or the plurality of elements of the phase modulator array can therefore adjust the respective phases of the plurality of secondary laser signals in response to the phase control signals such that the plurality of secondary laser signals have a predetermined phase relationship to the predetermined phase of the reference signal.

The beam combining means of this embodiment can also include means for generating the reference signal and a phase modulator for controllably adjusting the phase of the reference signal. Preferably, the reference signal is derived from the primary laser signal or one of the secondary laser signals. Alternatively, the means for generating the reference signal can include a reference laser source for producing the reference signal having a predetermined phase. In either instance, the fiber optic laser system and, in particular, the beam combining means can control the phase of the plurality of secondary signals to produce a laser output having a stable and accurate predetermined phase profile or phase taper across the aperture.

The beam combining means of an alternative embodiment includes a detector for detecting an intensity of the secondary laser signals. Based upon the detected intensity, the phase control means can adjust the respective phases of the secondary laser signals to create a predetermined phase relationship. For example, the secondary laser signals can be focused, such as with a transform lens, to a central spot in a focal plane. The phase control means of this embodiment can then adjust the respective phases of the secondary laser signals to maximize the intensity of the central spot or to minimize the intensity of light outside of the central spot. In order to compensate for signal perturbations introduced downstream of the beam combining means, such as by atmospheric boundary layer effects, the beam combining means of either embodiment can also include a phase modulator array which imposes a predetermined wavefront on the secondary laser signals.

Due, at least in part, to the amplification provided by the amplification means, such as the optical fiber amplifiers, the fiber optic laser system of the present invention provides a laser output having a relatively high power level. By appropriately dividing and amplifying the laser signals prior to their recombination, the output power capability of the laser can be scaled in a predetermined fashion. Within this predetermined output power capability, the actual output power of the laser can be controlled as desired by adjusting the gain of the optical amplifiers within the laser. In addition, the beam quality of the resulting laser output can be precisely controlled such that a single mode output beam having a predetermined phase profile and a relatively high brightness can be efficiently produced. As a result of the controllable beam quality and scalable power levels provided by the fiber optic laser system of the present invention, the fiber optic laser system can be employed in a number of varied applications, including applications demanding both precision and high power.

BRIEF DESCRIPTION OF THE DRAWINGS

FIG. 4 is a block diagram illustrating one embodiment of a distribution network of the fiber optic laser system of the present invention.

FIG. 5 is a block diagram illustrating one embodiment of a distribution module of the fiber optic laser system of the present invention in which the distribution network includes an optical amplifier and associated pump source upstream of the signal power splitter.

FIG. 6 is a block diagram illustrating another embodiment of a distribution module of the fiber optic laser system of the present invention which also includes a plurality of phase modulators associated with respective ones of the secondary laser signals.

DETAILED DESCRIPTION OF THE PREFERRED EMBODIMENT

The present invention will now be described more fully hereinafter with reference to the accompanying drawings, in which a preferred embodiment of the invention is shown. This invention may, however, be embodied in many different forms and should not be construed as limited to the embodiments set forth herein; rather, this embodiment is provided so that this disclosure will be thorough and complete and will fully convey the scope of the invention to those skilled in the art. Like numbers refer to like elements throughout.

Figure 1:
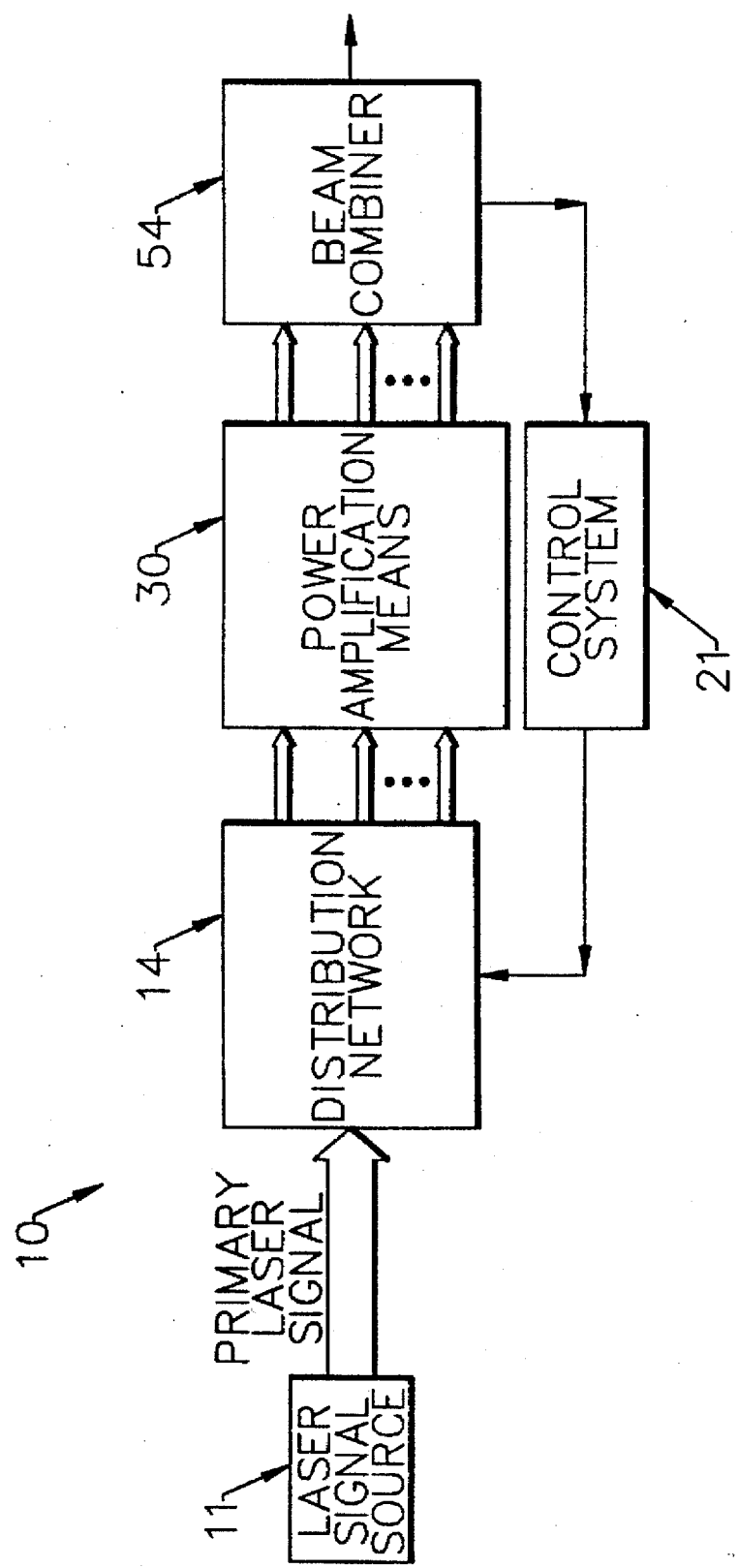
FIG. 1 is a block diagram illustrating the components of one embodiment of the fiber optic laser system of the present invention.

Referring now to FIG. 1, a fiber optic laser system 10 according to one embodiment of the present invention is illustrated. The fiber optic laser system includes a laser signal source 11 which, in turn, includes a master oscillator 12, such as a diode pumped fiber laser, a single mode diode laser, a diode pumped mode-locked oscillator or diode pumped rods, slabs or mirrors. The master oscillator preferably provides a primary laser signal having a predetermined wavelength and a predetermined power level. For example, the primary laser signal may have a predetermined wavelength of 1064 nanometers and a predetermined power level of 20 mW. However, the primary laser signal can have other wavelengths and power levels without departing from the spirit and scope of the present invention. In addition, the master oscillator typically provides a primary laser signal having a predetermined wavefront, such as $TM_{oo}$, and a predetermined linewidth. For example, the predetermined linewidth of the master oscillator is preferably selected such that the resulting coherence length of the laser signal source 11 is greater than the largest path length difference within the fiber optic laser system of the present invention.

Figure 2:
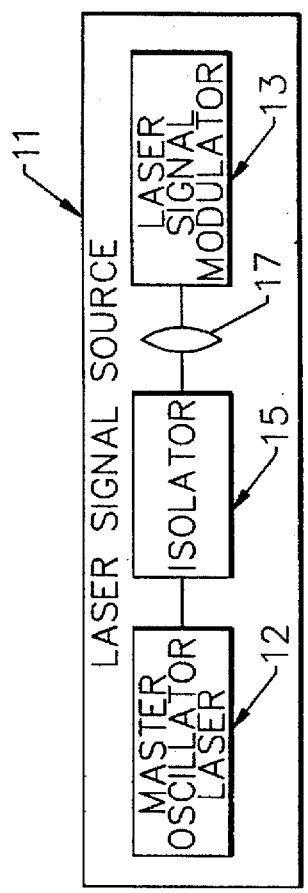
FIG. 2 is a block diagram of one embodiment of a laser signal source, including a master oscillator, of the fiber optic laser system of the present invention.

The master oscillator 12 preferably emits a single mode primary laser signal. In addition, the master oscillator is preferably adapted to generate a continuous wave (cw) primary laser signal. However, as shown in FIG. 2, the laser signal source 11 can also include a laser signal modulator 13 for modulating the amplitude or phase of the primary laser signal provided by the master oscillator. The laser signal modulator can modulate the primary laser signal by a variety of techniques, such as amplitude modulation or phase modulation, such that the master oscillator can produce a variety of waveforms, such as long pulse or short pulse, without departing from the spirit and scope of the present invention. In addition, the laser signal modulator can be controlled by external signals as shown in FIG. 2. Accordingly, the master oscillator effectively establishes the spectral and temporal waveform for the entire fiber optic laser system 10 as described hereinafter.

As known to those skilled in the art, the master oscillator 12 can be modulated directly or indirectly. Depending upon the design of the master oscillator and the magnitude of the current modulation, the master oscillator signal can be modulated in amplitude, frequency and phase.

Accordingly, in one advantageous embodiment, the laser signal source 11 includes a laser signal modulator 13 which provides modulation external to the laser cavity of the master oscillator 12. In this embodiment, the laser signal modulator can be integrated directly on the same substrate as the master oscillator or can be physically separate from the master oscillator. In the embodiment in which the laser signal modulator is physically separate from the master oscillator, the laser signal source can optionally include a coupling lens 17 to launch the signals emitted by the master oscillator into the laser signal modulator. In this embodiment, the laser signal modulator is also preferably optically isolated from the master oscillator with an optical isolator 15, such as a polarizer-Faraday Rotator-polarizer, as described below.

As known to those skilled in the art, optical feedback is created by optical reflections throughout the laser system 10 and from amplified spontaneous emission during amplification of the signals. Optical feedback is disruptive to the temporal stability of the master oscillator 12 which impedes the formation of a beam from the array of lasers. Consequently, unwanted backward propagating power is preferably suppressed within the laser system, such as with one or more optical isolators 15. Optical isolators allow the signals emitted by the master oscillator to propagate in a forward direction, while suppressing backward propagating noise.

Figure 9:
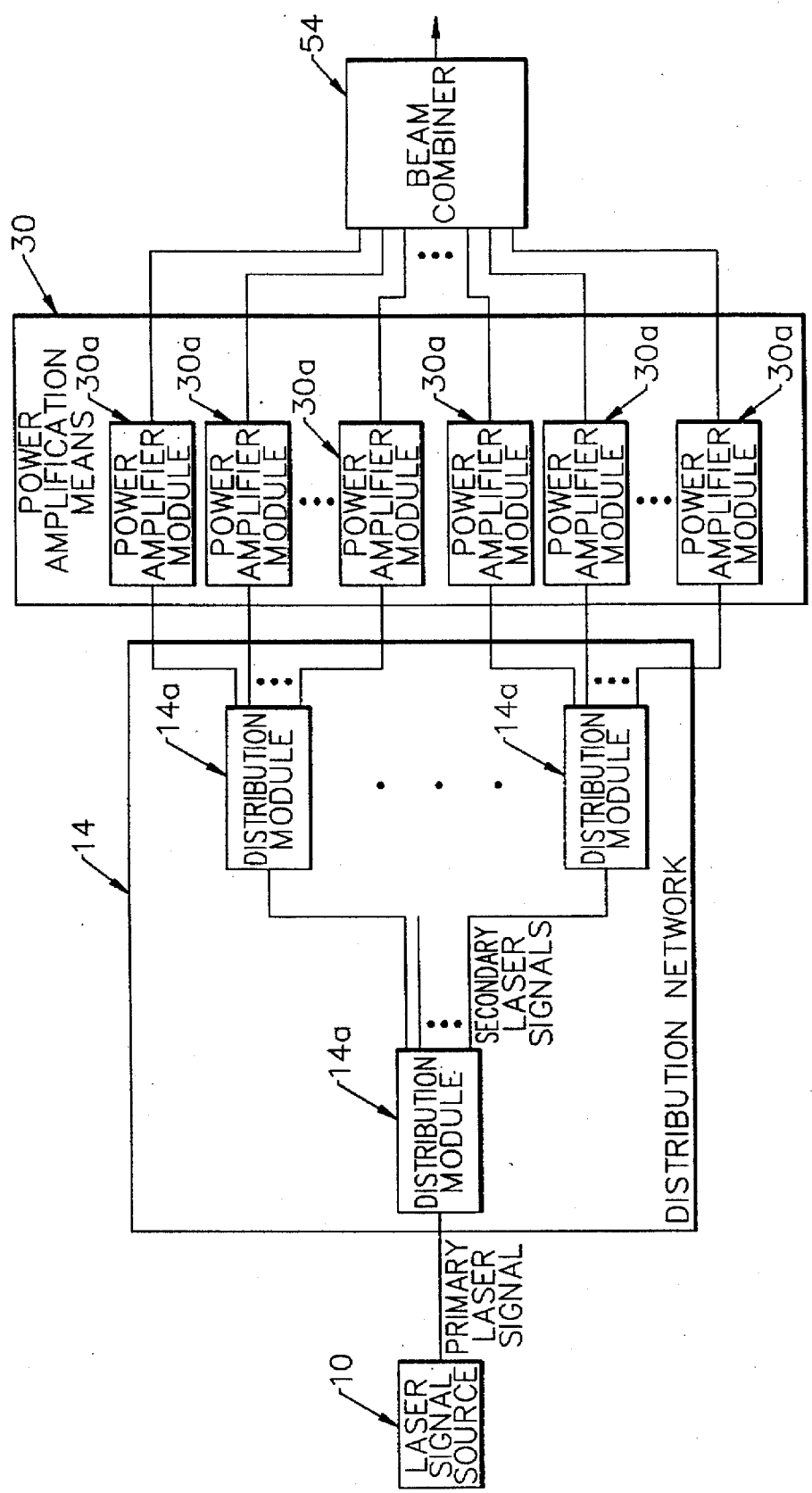
FIG. 9 is a partial schematic representation of the fiber optic laser system of one embodiment of the present invention illustrating a plurality of secondary distribution modules and a plurality of power amplification modules and further illustrating the combination of the outputs of a number of optical amplifiers by the beam combining means.

As illustrated in FIGS. 1 and 9, a fiber optic laser system 10 also includes a distribution network 14 having means for dividing the primary laser signal generated by the master oscillator 12 into a plurality of secondary laser signals. The distribution network preferably preserves the important characteristics of the primary laser signal in the secondary laser signals. For example, the secondary laser signals preferably have a predetermined frequency and amplitude relationship with respect to the primary laser signal.

As shown in FIG. 9, and described below, the one advantageous embodiment of the distribution network 14 includes one or more distribution modules 14a, each of which includes means for dividing the primary laser signal into a plurality of secondary laser signals. The distribution network and, in one embodiment, the distribution module preferably includes a plurality of optical waveguides, such as fiber optic guides and integrated optic waveguides, for guiding respective ones of the plurality of secondary laser signals. It will be apparent to those skilled in the art, however, that while the distribution modules are illustrated and described in detail hereinafter, the distribution means, including the means for dividing the primary laser signal, need not necessarily be modularized.

As shown in FIG. 1, the fiber optic laser system 10 also includes power amplification means 30 for amplifying signals within the fiber optic laser. For example, the amplification means can amplify the primary laser signal prior to the division of the primary laser signal into a plurality of secondary laser signals by the distribution module 14a. Alternatively, the amplification means can individually amplify the secondary laser signals downstream of the distribution module or the distribution module itself can include at least a portion of the amplification means.

As shown in FIG. 5, the distribution module 14a can include an optical amplifier, such as an optical fiber amplifier 16, which forms a portion of the amplification means. In the illustrated embodiment, the optical fiber amplifier receives and amplifies the primary laser signal. Alternatively, the distribution module can include a number of optical amplifiers, one of which individually amplifies each secondary laser signal. The optical fiber amplifier of one embodiment includes an optical fiber having a core doped with one or more rare earth elements such as ytterbium, neodymium, praseodymium, erbium, holmium and thulium. In addition, due to the relatively long length of the optical fiber amplifier, the optical fiber amplifier can be looped to minimize packaging requirements.

Figure 7:
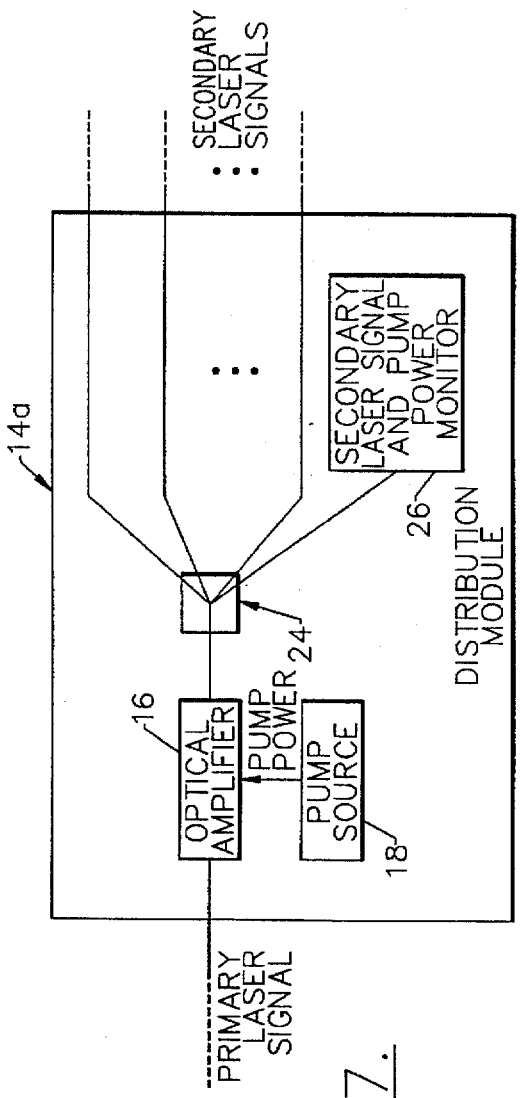
FIG. 7 is a block diagram illustrating one embodiment of a distribution module of the fiber optic laser system of the present invention in which the distribution module includes an optical amplifier upstream of the signal power splitter and a monitor for monitoring the secondary laser signals and/or the pump power.
Figure 8:
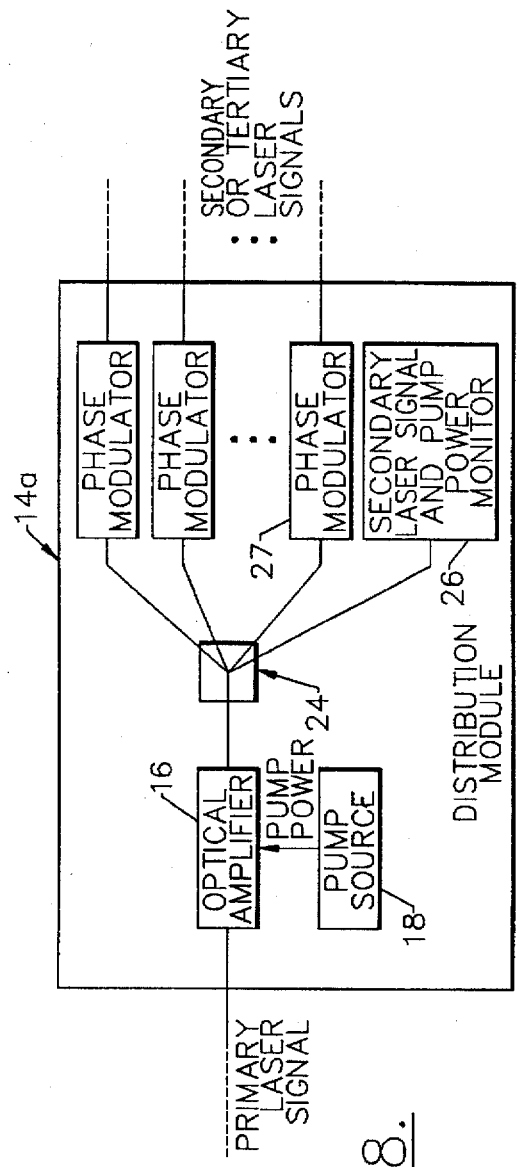
FIG. 8 is a block diagram illustrating a preferred embodiment of a distribution module of the fiber optic laser system of the present invention in which the distribution module includes an optical amplifier upstream of the signal power splitter, a monitor for monitoring the secondary laser signals and/or the pump power, and a plurality of phase modulators associated with respective ones of the secondary laser signals.

As also shown in FIGS. 6–8, the distribution module 14a can also include a pump source 18, such as a laser diode, a laser diode array having a plurality of individual emitters, a fiberoptic laser or other suitable pump laser, for pumping the optical fiber amplifier 16 such that the primary laser signal is amplified. As known to those skilled in the art, the pump source provides pump signals of a predetermined wavelength to the optical fiber amplifier which, in turn, excites the dopant, such as the rare earth elements, so as to amplify the primary laser signal transmitted therethrough. Preferably, the wavelength of the pump signals is different than the predetermined wavelength of the primary laser signal. For example, the primary laser signal can have a predetermined wavelength of 1064 nanometers while the pump signals can have a wavelength of 808 nanometers. However, for an optical fiber amplifier having a core doped with a rare earth element, the wavelengths of both the primary laser signal and the pump signal are preferably within one of the absorption bands of the rare earth ion or, alternatively, within separate absorption bands of the rare earth ion.

Figure 10:
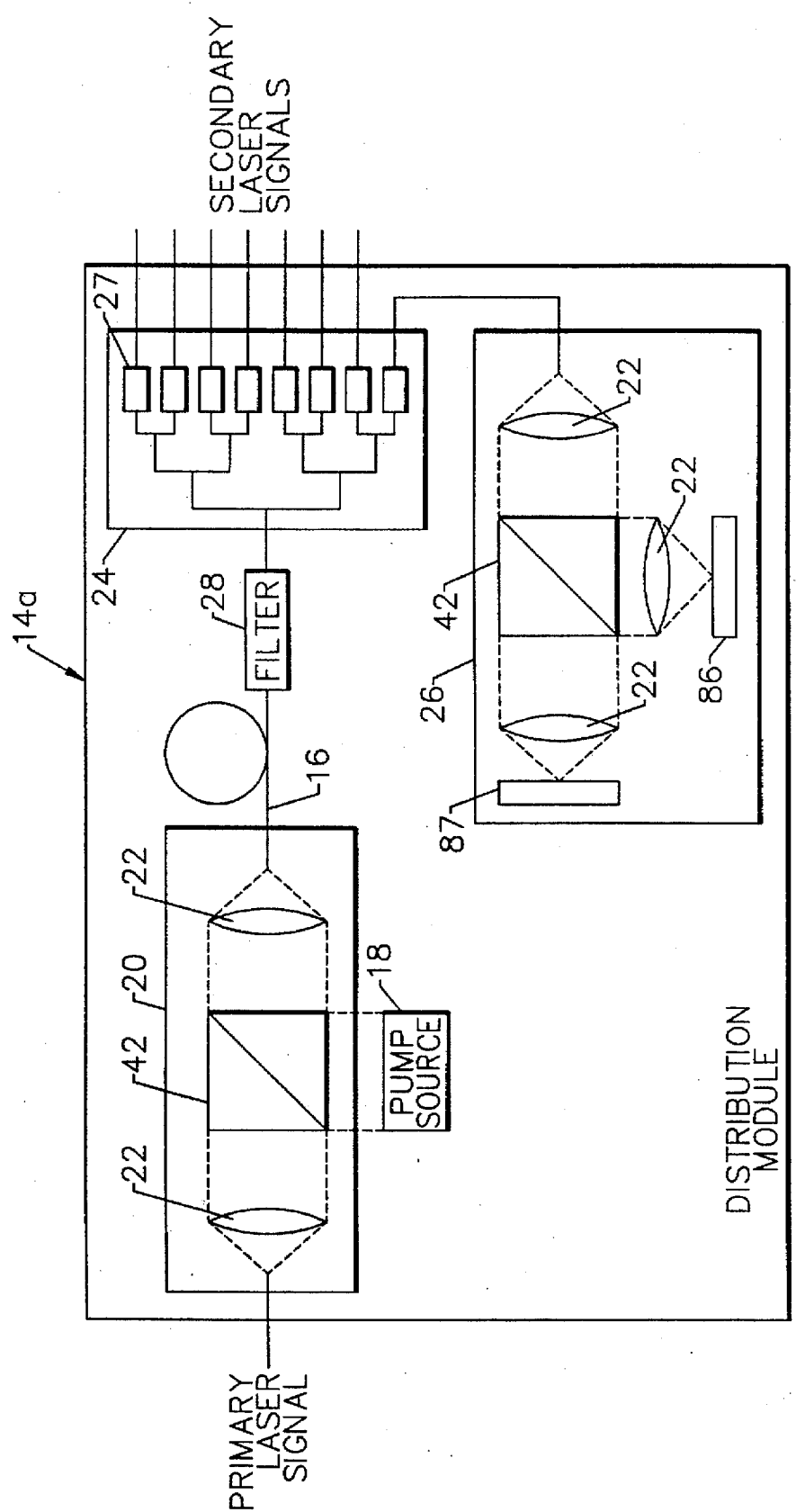
FIG. 10 is a schematic representation of a distribution module of one embodiment of the fiber optic laser system of the present invention.

As also illustrated in FIG. 10, the distribution module 14a can include a beam combiner 20, typically including a dichroic beam combiner 42, such as a dichroic cube, a dichroic filter or a fused fiber coupler, for combining the primary laser signal and the pump signals and for coupling the combined signals to the optical fiber amplifier 16. The optical signals, including the primary laser signal, the secondary laser signals and the pump signals, are preferably coupled to the optical fiber amplifier and to the various optical elements, such as the beam combiner, with one or more lens elements 22, such as collimating lens or focusing lens, as schematically illustrated in FIG. 10 and as known to those skilled in the art.

The distribution module 14a also includes a waveguide signal splitter or signal power splitter 24 for dividing the amplified primary laser signal into a plurality of secondary laser signals as shown in FIGS. 4-7. Preferably, the signal power splitter is a passive coupler, such as a 3 dB fiber coupler or a 1:N single mode star coupler, such that the frequency and wavelength of the secondary laser signals is not altered. The primary laser signal can be divided into any predetermined number of secondary laser signals. However, laser outputs having higher power levels can typically be generated by increased divisions of the primary laser signal since further amplification is then possible as described hereinafter. Accordingly, the laser system designer can optimize the amplification and division of the primary laser signal in view of the requirements for a particular application.

As also illustrated in FIGS. 7, 8 and 10, the distribution module 14a can include a monitor 26 which, in turn, includes one or more lens elements 22, a detector 86 for detecting at least one of the plurality of secondary laser signals and a detector 87 for detecting at least a portion of the pump power or pump fluence injected by the pump source 18. Accordingly, the monitor can confirm that the distribution module and/or the pump source are operating properly and any operational defects can be readily detected and repaired.

The distribution module 14a and, more particularly, the optical fiber amplifier 16 can also include a filter 28, such as a fiber grating, a dichroic filter, a birefringent in-line filter, a Mach-Zehnder filter having an unequal path or an appropriately doped core of the optical fiber amplifier. The filter is preferably a band pass filter which preferentially removes signals having wavelengths outside a predetermined range of wavelengths centered about the predetermined wavelength of the primary laser signal. Accordingly, spurious optical signals, such as signals generated by Raman scattering or other nonlinear effects within the optical fiber amplifier at wavelengths other than the wavelength of the primary laser signal, can be selectively attenuated, if not eliminated, at predetermined intervals to thereby diminish the effects of scattering within the optical fiber amplifier and, more particularly, to prevent undesirable gain reduction of the primary laser signal.

While the spurious signals introduced by scattering within the optical fiber amplifier 16 can be removed, such as by filtering, the spurious signals can, instead, be allowed to propagate through the optical fiber amplifier and be amplified thereby. By subsequently suppressing, such as by filtering, signals having the predetermined wavelength of the primary laser signal, the fiber optic laser system 10 can support the amplification and transmission of optical signals generated during the scattering process and having a wavelength different than the predetermined wavelength.

Although not shown, each module, such as each distribution module 14a and/or power amplification module 30a, preferably includes means for minimizing backward propagating signals. Such means can be disposed at one or more input port(s) and/or one or more output port(s) of the module. For example, an optical isolator, such as a Faraday rotator element with appropriate polarizers as described above, can be disposed at one or more input and/or output port(s) to block backward propagating signals, such as amplified spontaneous emission. In addition, each input and output port of a module, such as a distribution module, can include a fiber optic connector.

As illustrated in FIG. 9, the fiber optic laser system 10 can include means, such as additional distribution modules 14a, including secondary and tertiary distribution modules, for further amplifying and dividing the secondary laser signals. The signals produced by these additional distribution modules also preferably include the important characteristics of the primary laser signal. For example, these signals typically have a predetermined frequency and amplitude relationship to the primary laser signal. While two cascaded levels of distribution modules are shown, the fiber optic laser system can include additional levels of distribution modules without departing from the spirit and scope of the present invention. Due to the further amplification, the resulting laser output produced by the combined signals can be further increased. Accordingly, the output power provided by the fiber optic laser system of the present invention is scalable such that the resulting power level of the laser output can be selected based upon the requirements of a particular application by controllably selecting the amplification and extent of division of the laser signals propagating therethrough.

Figure 11:
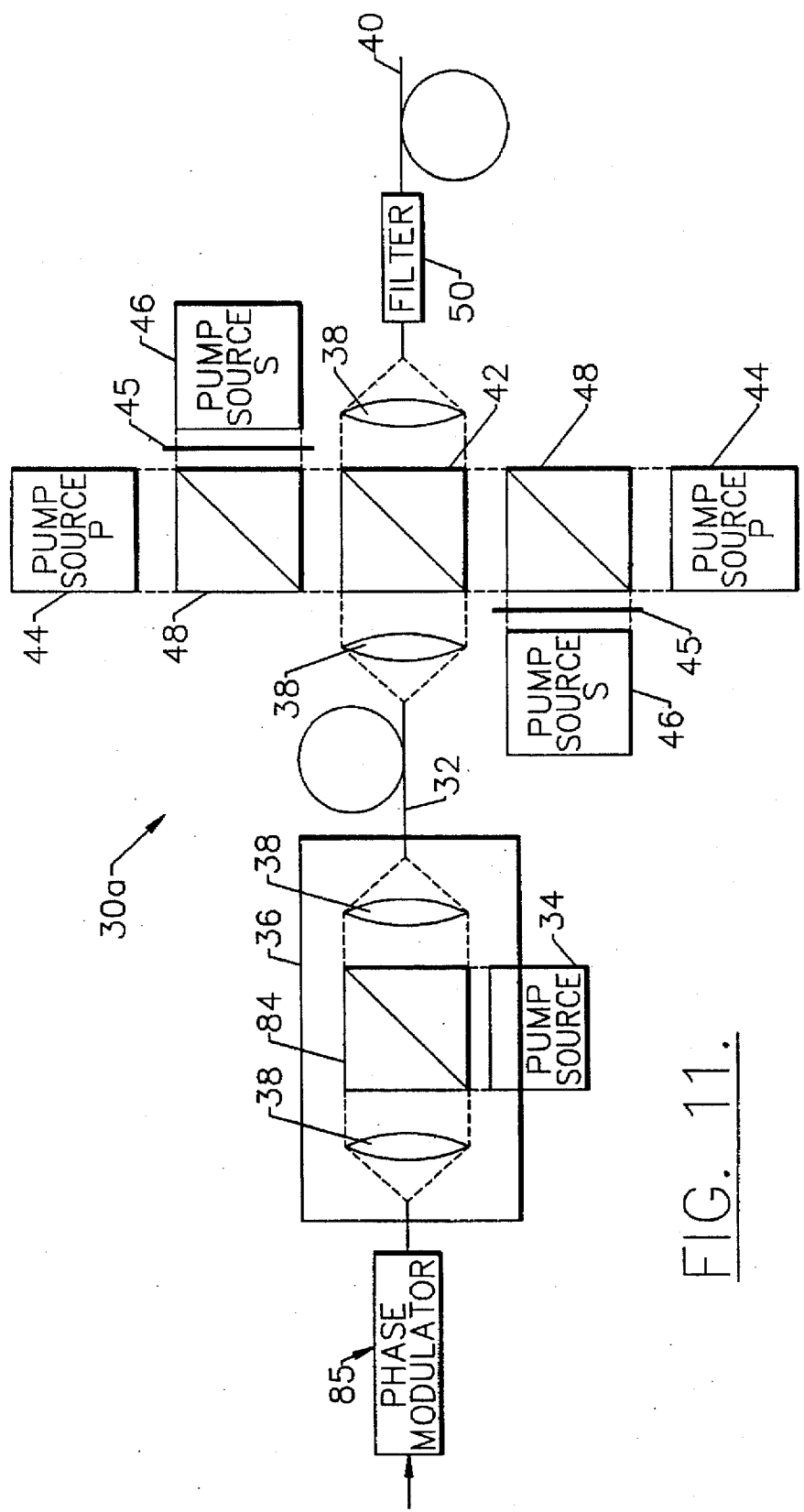
FIG. 11 is a schematic representation of a power amplification module of one embodiment of the fiber optic laser system of the present invention.

As illustrated schematically in FIGS. 1, 9 and 11, the amplification means of the fiber optic laser system 10 can also include one or more power amplification modules 30a as shown in FIG. 9, each of which includes means for amplifying signals. As shown, the power amplification module of one embodiment is downstream of at least one distribution module 14a so as to receive a respective secondary laser signal. In one advantageous embodiment shown schematically in FIG. 9, a power amplification module is associated with each of the plurality of secondary laser signals. In addition, the power amplification modules are preferably downstream of the distribution modules which are furthest downstream as also shown in FIG. 9 so as to amplify the secondary or tertiary laser signals provided thereby. However, in alternative embodiments, the power amplification module can be upstream of the distribution modules so as to amplify the primary laser signal or can be incorporated within the distribution module in order to amplify either the primary or secondary laser signals.

As shown in FIG. 11, the power amplification module 30a also includes an optical amplifier, such as at least one optical fiber amplifier 32, 40 for amplifying the respective secondary laser signal. Accordingly, the power amplification module further increases the power level of the resulting laser output. Following amplification by the optical fiber amplifiers of the power amplification module 30a, the amplified signals can be transmitted to remotely located apertures by one or more optical fibers or fiber optic waveguides.

In order to provide the increased power amplification, the optical fiber amplifiers 32, 40 of the power amplification module 30a preferably includes a dual core optical fiber. The dual core optical fiber generally has an inner core doped with one or more rare earth elements, such as ytterbium, neodymium, praseodymium, erbium, holmium and thulium, an outer core surrounding the inner core and a cladding layer surrounding the outer core. In one embodiment, however, the numerical aperture of the dual core optical fiber is increased by coating the outer core with a soft gold coating, instead of the cladding layer. Although the optical fiber amplifiers preferably include dual core optical fibers, the optical fiber amplifiers can, instead, include other types of optical fibers without departing from the spirit and scope of the present invention.

The power amplification module 30a also preferably includes at least one pump source 34, such as a laser diode array, for pumping the optical fiber amplifier 32 as described above. As shown in FIG. 10 and described above in conjunction with the distribution module 14a, the secondary laser signal and the pump signals provided by the pump source are preferably coupled to the optical fiber amplifier of the power amplification module, such as by a beam combiner 36 which generally includes a dichroic beam combiner 84 and one or more lens elements 38.

As known to those skilled in the art, the outer core of a dual core optical fiber generally has a predetermined size, shape and numerical aperture. For example, the outer core of a dual core optical fiber can have a generally rectangular or elliptical shape. In order to increase or maximize the efficiency with which the pump signal is coupled to the outer core of the optical fiber amplifier 32 and, thus, the magnitude of the amplification provided by the optical fiber amplifier, the pump source 34, such as a laser diode array comprised of a plurality of emitters as illustrated in U.S. Pat. No. 5,212,707 entitled "Array Of Diffraction Limited Lasers And Method 0f Aligning Same" which issued May 18, 1993 to Jeffrey Heidel et al., can be adapted to emit a laser beam having a predetermined size, shape and numerical aperture which is matched to the predetermined cross-sectional size, shape and numerical aperture of the outer core. For example, the pump source can include collimating optics, such as an array of collimating lenses, to controllably shape the emitted laser beam to thereby match the cross-sectional size, shape and numerical aperture of the outer core of the dual core optical fiber. Thus, the pump source can be mode matched to the optical fiber.

In order to further increase the amplification provided by the optical fiber amplifier 32 of the power amplification module 30a, the pump source 34 of one embodiment can include a plurality of distributed pump sources for pumping the optical fiber amplifier in a plurality of spaced-apart regions. For example, as schematically illustrated in FIG. 11, the optical fiber amplifier can be split into first and second optical fiber amplifiers 32 and 40 arranged in an end-to-end relationship such that the signals transmitted therethrough are coupled from the first optical fiber amplifier to the second optical fiber amplifier. Each optical fiber amplifier can be looped, if desired, due to its relatively long length. The pump source can include a first pump source 34 for providing pump signals to the input of the first optical fiber amplifier and second pump sources 44,46 for providing pump signals to the output of the first optical fiber amplifier and to the input of the second optical fiber amplifier. As illustrated, the pump signals provided by the first and second pump sources can be provided off-axis, but can be coupled to the respective optical fiber amplifiers, such as by a dichroic beam combiner 42.

The amplification provided by the optical fiber amplifiers 32, 40 can also be increased by splitting the optical fiber amplifier and coupling additional pump signals into both optical fiber amplifiers as described below. In the illustrated embodiment, the pump signals are coupled into the optical fiber amplifiers, such as a dichroic beam combiner 42, in different directions relative to the transmission direction of the laser signals. More particularly, the pump signals of the second pump source of this exemplary embodiment are coupled to the downstream end of a first optical fiber amplifier 32 so as to travel upstream, that is, the pump signals would travel in a direction substantially opposite the transmission direction of the laser signals. In contrast, the pump signals provided by the second pump source to the second optical fiber amplifier 40 travel in substantially the same direction as the laser signals transmitted therethrough. Alternatively, the pump signals can be coupled to the optical fiber amplifiers so as to propagate in the same directions or in both directions relative to the transmission direction of the laser signals without departing from the spirit and scope of the present invention.

As shown in FIG. 11, the pump source of one embodiment can include a plurality of individual pump sources for further increasing the amplification provided by the optical fiber amplifiers 32, 40. For example, the power amplification module 30a can include first and second pump sources 44, 46 (designated Pump Source P and Pump Source S) adapted to produce respective pump signals having p-polarization and s-polarization states, respectively, with respect to a polarization beam combiner 48. For example, the polarization states of the respective pump signals produced by the first and second pump sources can initially be identical. However, a half-wave plate 45 can be associated with the second pump source, for example, to shift its respective polarization state.

According to this embodiment, the power amplification module 30a includes a polarization beam combiner 48 for combining the respective pump signals of the first and second pump sources 44, 46 to produce a combined pump signal having a mixed polarization state, such as circular, different than either the first or second polarization states. By combining pump sources having different polarization states, the brightness of the combined pump signals can be increased relative to the respective brightness of the pump signals produced by either the first or second pump sources. Consequently, the optical fiber amplifiers can be further excited so as to provide further amplification of the secondary laser signals.

Alternatively, the first and second pump sources 44, 46 can produce respective pump signals having first and second wavelengths, respectively. The first and second wavelengths are preferably different. Accordingly, the power amplification module 30 of this embodiment includes a dichroic beam combiner for combining the respective pump signals of the first and second pump sources to generate a combined pump signal having a mixed wavelength different than the first and second wavelengths and having increased brightness.

In addition, the bandwidth of the fiber optic laser system 10 of the present invention can be broadened by employing an up conversion process. In particular, the optical fiber amplifier 16, 32, 40 can be inverted by highly pumping the optical fiber amplifier so as to produce optical signals having different wavelengths than the predetermined wavelength of the primary laser signal.

As explained above in conjunction with the distribution module 14a, the power amplification module 30a and, more particularly, the optical fiber amplifiers 32, 40 of the power amplification module, can include a band pass filter 50, such as a fiber grating, a dichroic filter, a birefringent in-line filter, a Mach-Zehnder filter having an unequal path or an appropriately doped core of the optical fiber amplifier for selectively removing optical signals having wavelengths different than the predetermined wavelength of the primary laser signal. Accordingly, scattering effects introduced by the optical fiber amplifiers can be attenuated, if not eliminated.

As known to those skilled in the art, an optical fiber amplifier 16, 32, 40 generally amplifies signals having a range within a predetermined range of wavelengths. For example, for an optical fiber amplifier doped with one or more rare earth elements, the optical fiber amplifier preferentially amplifies signals having a wavelength within one of the emission bands of the rare earth ion. Accordingly, the predetermined wavelength of the primary laser signal, such as 1064 nanometers, and the predetermined wavelengths of the emission bands are preferably within the predetermined range of wavelengths and, more preferably, within one or more of the emission bands of the rare earth ion.

Although pump sources which provide pump signals of different polarization or different wavelengths are described and illustrated, these techniques can be combined such that the pump sources produce pump signals having both different polarization and different wavelengths which are subsequently combined to create a mixed pump signal having an even greater brightness.

Figure 3:
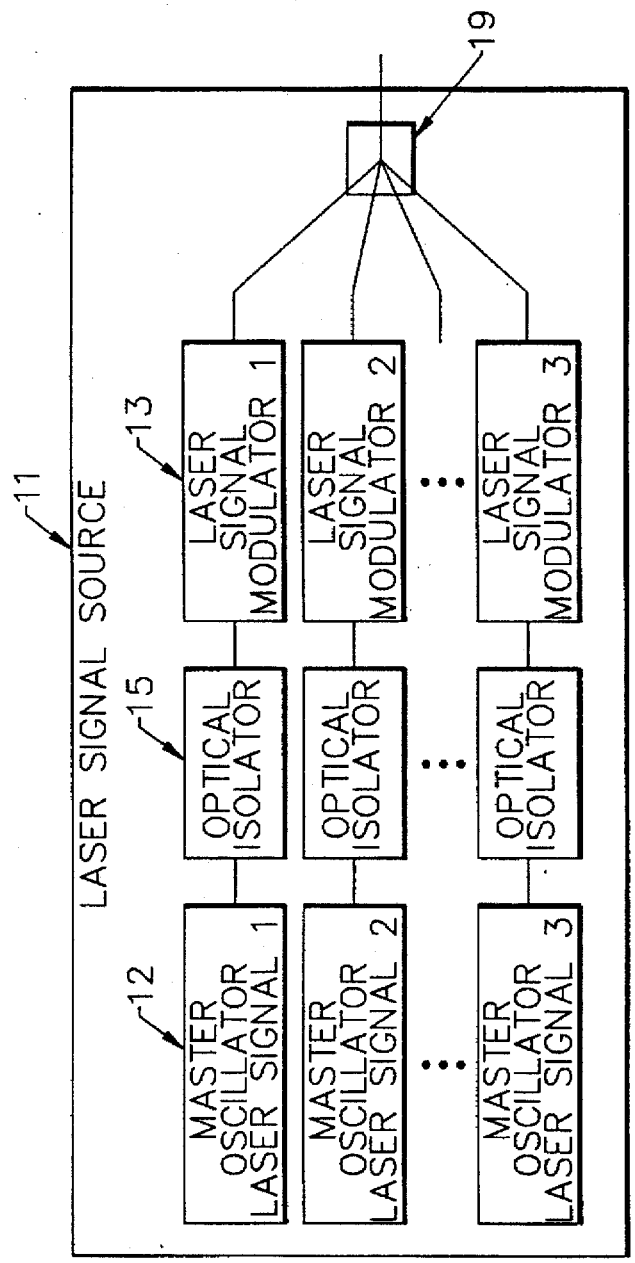
FIG. 3 is a block diagram of another embodiment of a laser signal source of the fiber optic laser system of the present invention illustrating a plurality of master oscillators and laser signal modulators.

In addition, although a laser signal source having a single master oscillator 12 has been described above, the laser signal source 11 can include a plurality of master oscillators, the outputs of which are summed, such as with a laser signal combiner 19 and, more preferably, with an integrated waveguide combiner, a fiber optic combiner or a grating, as shown in FIG. 3. The plurality of master oscillators can produce signals which have separate and distinct wavelengths. These signals can then be combined, such as with a dichroic filter, a polarization beam splitter, a partial transmission beam splitter, a fiber optic combiner or an integrated optic combiner. In order to properly form the far-field beam, however, the path length of each leg of the laser signal source preferably differs by no more than the effective coherence length of the multiplicity of master oscillators. The laser signal source can also include a plurality of laser signal modulators 13 and optical isolators 11 associated with respective ones of the master oscillators.

The fiber optic laser system 10 of one embodiment also includes beam combining means 54 for combining the plurality of secondary laser signals into a single laser output. The laser output typically has a power level greater than the predetermined power level of the primary laser signal. In addition, the overall power capability of the fiber optic laser system can be scaled during the system design by controlling the amplification and division of the primary laser signal. In operation, the actual output power of the fiber optic laser system can be selected as desired within the overall power capability by appropriately adjusting the gain of one or more optical amplifiers. Further, the frequency of the output signal preferably has a predetermined relationship to the frequency of the primary laser signal. For example, the respective frequency of the primary laser signal and the output signal are preferably identical.

Figure 12:
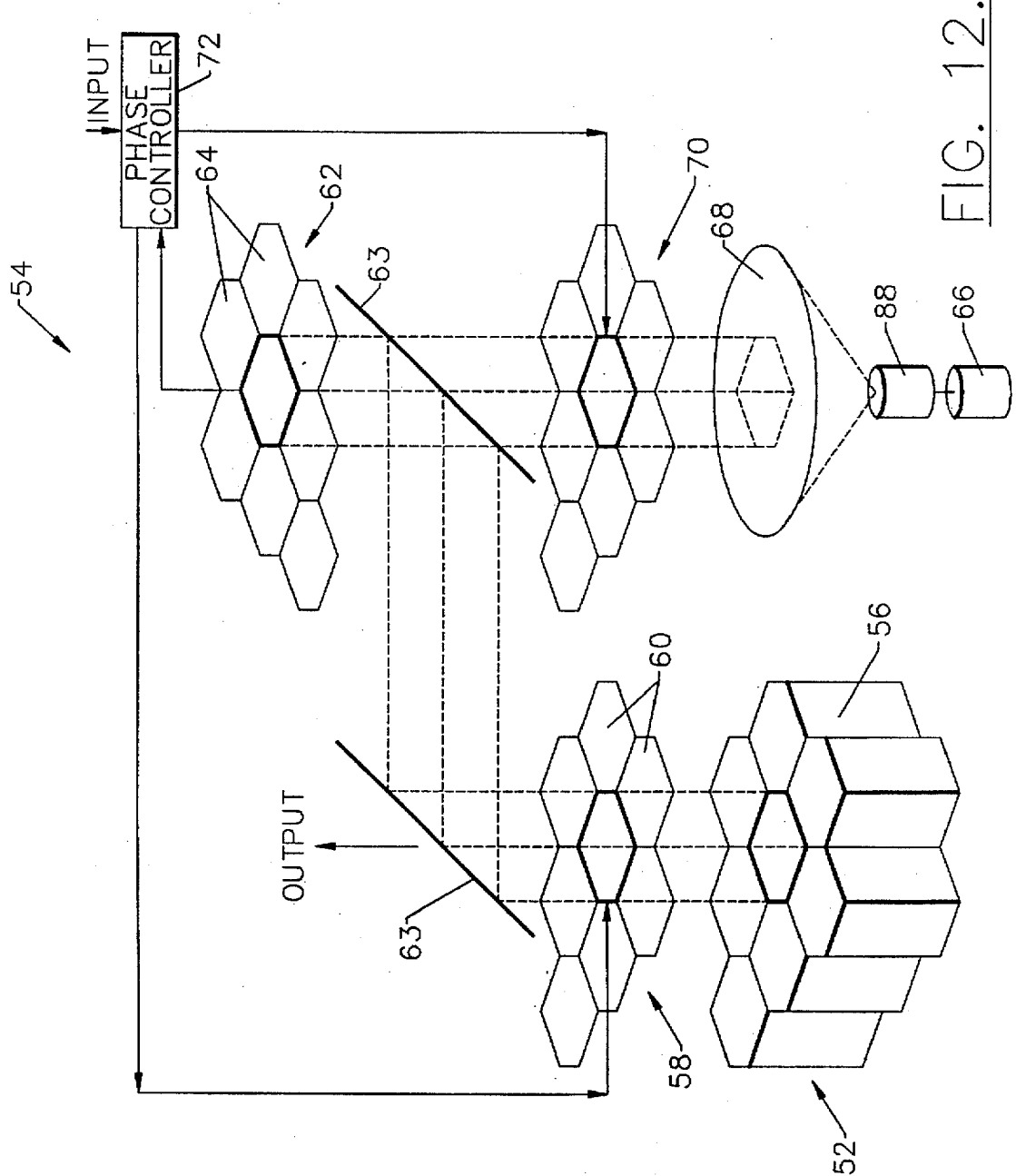
FIG. 12 is a schematic view illustrating the beam combining means of one embodiment of the fiber optic laser system of the present invention, including an array of closely packed lens elements.
Figure 13:
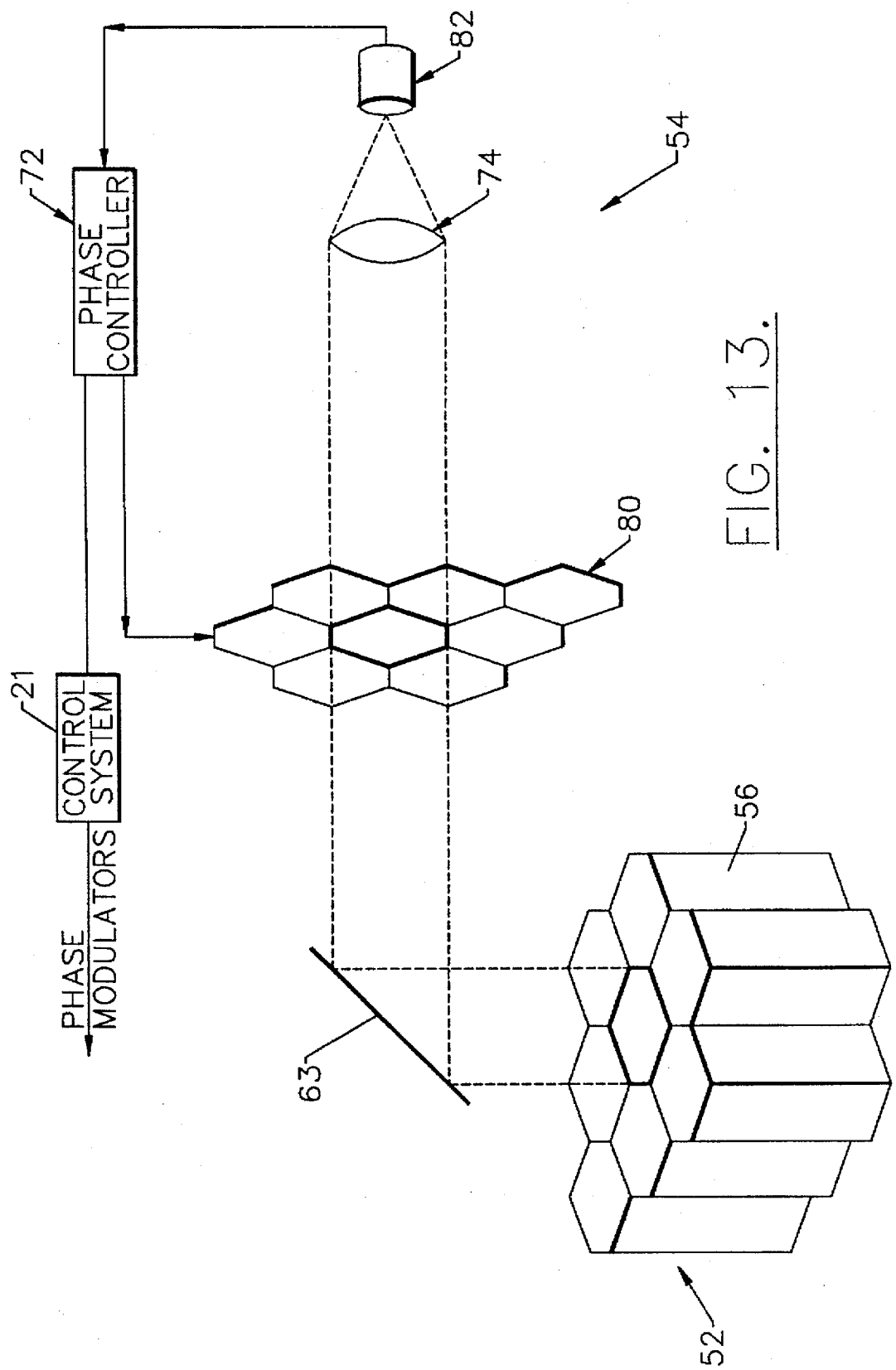
FIG. 13 is a schematic view illustrating the beam combining means of another embodiment of the fiber optic laser system of the present invention, also including an array of closely packed lens elements.

As shown in FIGS. 12 and 13, the beam combining means 54 can include a beam combining array 52 having a plurality of lens elements 56 for collimating respective ones of the plurality of secondary laser signals. Typically, one lens element collimates each secondary laser signal. For example, the lens elements can include a plurality of graded index lens elements. In this embodiment, the index of grading of the lens element can be obtained by deliberately radially grading the index of refraction or by inducing a radial grading of the index of refraction by a thermal gradient in a homogenous medium. Alternatively, the lens elements can include corrected aspheric lens elements, holographic lens elements, binary diffractive lens elements, binary optic lens elements, surface refraction lens elements or other types of lens elements known to those skilled in the art.

The plurality of lens elements 56 also preferably fill a predetermined aperture. In one advantageous embodiment, the lens elements fill an aperture at least as large as the cross-sectional shape of the lens element. For example, in the illustrated embodiment in which the lens elements have a hexagonal cross-sectional shape, the lens elements preferably fill an aperture bounded by an imaginary circle extending tangential to the hexagonal cross-section of the lens elements.

While the lens elements 56 are illustratively shown as having a hexagonal cross-section, the crosssections of the lens elements can have a variety of other shapes without departing from the spirit and scope of the present invention. As also shown in FIGS. 12 and 13, the lens elements are preferably arranged in a closely-packed array 52 in order to provide a compact fiber optic laser system 10 with good beam forming and control characteristics. Accordingly, the cross-sectional shape of the lens elements is preferably adapted to mate adjacent lens elements having the same cross-sectional shape. In addition, the lens elements are preferably relatively long, such as 10 mm in one embodiment, in order to mechanically self-align the stacked array of lens elements.

The lens elements 56 can be fabricated so as to have the predetermined cross-sectional shape by either pulling or extruding the lens element. For example, the boule from which the lens element is pulled can be formed to have the desired cross-sectional shape, such as by grinding, such that the resulting lens element will have the predetermined cross-sectional shape. However, other methods of fabricating the lens elements known to those skilled in the art can be employed without departing from the spirit and scope of the present invention.

The beam controlling means 54 also includes beam sampling means 63 for redirecting a portion of the secondary laser signals and means for controlling or modulating a predetermined characteristic of one or more of the secondary laser signals, such as amplitude or phase. For example, the beam controlling means can include means for individually controlling the respective phases of each of the collimated secondary laser signals such that the resulting laser output has a predetermined phase profile. According to one embodiment, the phase controlling means of the beam combining means can control the respective phases of each secondary laser signal based upon the location to which the secondary laser signals are mapped within a predetermined aperture. Thus, the beam combining means of this embodiment can produce a desired phase front across the face of the aperture, thereby enabling coherent combination of the plurality of secondary laser signals into a single, high quality, high power laser output beam. For example, the laser output can be focused to a predetermined spot at a predetermined range or the laser output can provide relatively uniform illumination of a predetermined area at a predetermined range. One exemplary method of modulating the respective phases of a plurality of signals is described in an article entitled "One Dimensional Scaling Of 100 Ridge Waveguide Amplifiers" by K. H. No, et al. which was published in IEEE Photonics Technology Letters, Vol. 6, No. 9, pp. 1062–66 (September 1994).

According to another embodiment, the beam combining means 54 can also include means for controlling the amplitude of each of the collimated secondary laser signals by adjusting the gain of the respective amplification modules. Typically, the respective amplitudes of the secondary laser signals are adjusted based upon the location to which the respective secondary laser signals are mapped within the predetermined aperture. Thus, the beam combining means of this embodiment can produce a laser output beam of high quality while minimizing power lost to side lobes in the far-field which are caused by diffraction effects in apertures the size of the predetermined aperture.

For embodiments of the beam combining means 54 which control the respective phases of the secondary laser signals, the beam combining means can include a phase modulator array 58 having a plurality of phase modulator elements 60 for controllably adjusting the respective phases of the plurality of secondary laser signals. Each phase modulator preferably modulates a respective one of the plurality of secondary laser signals in response to a control signal as described below. The phase modulator elements can include liquid crystal modulators. However, the phase modulator elements can also include electro-optic phase modulators, in-line fiber optic phase modulators which are responsive to stress, electric fields, magnetic fields or temperature, adaptive optics such as semiconductor wafers having movable mirrors defined thereon or other electrically-actuated phase modulators known to those skilled in the art.

Instead of modulating the respective phases of the secondary laser signals with a phase modulator array 58, the beam combining means can include a number of phase modulators disposed upstream of the lens elements 56 and associated with respective ones of the secondary laser signals. For example, the distribution network 14 and, more preferably, the distribution modules 14a include a number of integrated phase modulators 27 adapted to modulate respective ones of the secondary laser signals in response to a control signal as described below. In another embodiment, the power amplification means 30 and, more preferably, the power amplification modules 30a include a number of phase modulators 85 adapted to modulate respective ones of the laser signals in response to a control signal, as shown schematically in FIG. 11.

According to a first embodiment illustrated in FIG. 12, the beam combining means 54 also includes detection means for detecting at least one predetermined characteristic of the plurality of secondary laser signals and for comparing the detected characteristic with a predetermined reference characteristic. For example, the predetermined characteristic can include the phase and/or amplitude of the secondary laser signals.

In one embodiment, the detection means includes a detector array 62 having a plurality of detector elements 64. The detector elements compare a predetermined characteristic of a respective one of the plurality of secondary laser signals, such as phase, to a predetermined characteristic of a reference signal. Accordingly, the beam combining means 54 also preferably includes means for generating a reference signal. Typically, the reference signal generating means generates one reference signal for each respective secondary laser signal. The means for generating a reference signal can include a reference laser source, such as a local oscillator 66. Alternatively, the reference signal can be derived from the master oscillator or from one of the secondary laser signals.

In either embodiment, the reference laser source preferably produces one or more reference signals, each reference signal having a respective predetermined phase and amplitude which corresponds to respective ones of the plurality of secondary laser signals. As illustrated in FIG. 12, the means for generating a reference signal can also include a collimating lens 68 associated with the local oscillator for collimating the reference signals. The means for generating a reference signal can also include an array of phase modulators 70 for controllably adjusting the respective phases of each of a plurality of reference signals. Thus, the wavefront of the reference signal can be adjusted, if desired, to compensate for known phase perturbations downstream of the beam combining means 54, such as phase perturbation effects in the atmosphere. As illustrated schematically in FIG. 12, the phase modulators of the reference signal generating means can also include a variety of electrically actuated phase modulators, such as liquid crystal modulators, electro-optic phase modulators, in-line fiber optic phase modulators or adaptive optics.

Accordingly, the predetermined characteristic, such as phase and/or amplitude, of the reference signal can be controllably selected, such as by the laser system designer, and can be compared to the same predetermined characteristic, such as phase, of a respective secondary laser signal. As illustrated in FIG. 12, the means for generating a reference signal can also include a wideband phase modulator 88 for controllably modulating the plurality of reference signals with a common phase modulation. Accordingly, a phase dither may be applied to all of the plurality of reference signals, such that when each reference signal is coherently combined with a respective one of the plurality of secondary laser signal samples, an amplitude signal bearing phase error information is generated by a respective one of the plurality of detector elements 64. Based upon the differences between the respective phases of the reference and secondary laser signals, phase control means of the beam combining means 54, illustratively depicted as a controller 72, can provide phase control signals to the phase modulator array 58. Alternatively, the phase control means can provide phase control signals to a number of phase modulators 27 and/or 85 disposed upstream of the lens elements 56 via a control system 21, such as a microprocessor or microcontroller, as shown schematically in FIG. 1, to achieve the same result.

The phase control signals simultaneously or sequentially adjust the phase of each respective secondary laser signal, such as by modulating the phase of each respective secondary laser signal with the respective phase modulator element 60 or phase modulator 27 and/or 85, to match or be in a predetermined phase relationship with the predetermined phase of the respective reference signal. Accordingly, the beam combining means 54 implements a predetermined phase front of the output beam from the fiber optic laser system 10, and can control said phase front through time to implement a predetermined time history of the phase front of the output beam from the fiber optic laser system 10. Thus, the phase profile or phase taper of the collimated laser output of the fiber optic laser system 10 of the present invention can be controlled and shaped. Accordingly, an output signal having a relatively high power and having controllable beam qualities, such as collimation and focus, can be provided by the fiber optic laser system of the present invention.

Instead of being compared to a reference signal as described above in conjunction with FIG. 12, the respective phases of the secondary laser signals can be adjusted to maximize the resulting intensity of the output beam. Thus, as shown in FIG. 13, the plurality of secondary laser signals can be collimated by the lens elements 56 and focused to a single point, such as by a transform lens 74. By analyzing the relative intensity of the central spot, such as with a detector array 82, the beam combining means 54 can obtain a relative measurement of the respective phases of the secondary laser signals.

The beam combining means 54 of this embodiment operates under the principle that the wavefront created by the plurality of secondary laser signals will be focused by the transform lens 74 to the tightest spot with the highest on-axis intensity in instances in which the wavefront is flat. Conversely, any phase distributions in the wavefront created by the plurality of secondary laser signals will produce a lower on-axis intensity and significant power in the sidelobes. Consequently, the detector array 82 is preferably disposed in the focal plane of the transform lens and, therefore, in the simulated far field of the laser array in order to monitor the relative magnitude of the on-axis and off-axis power.

By sequentially dithering the respective phase of each secondary laser signal, such as with the phase controller 72 as shown in FIG. 13, and continuing to analyze the intensity of the central spot, the beam combining means 54 of this embodiment can determine the appropriate phase setting for each secondary laser signal in order to maximize the intensity of the central spot, thereby also creating a relatively flat phase front. In particular, if the on-axis intensity increases during a phase test, the phase controller will retain the new phase setting of the respective secondary laser signal and will proceed to test the next secondary laser signal. If, however, the on-axis intensity decreases during a phase test, the phase of the respective secondary laser signal is returned to its original phase setting prior to testing the next secondary laser signal. For the time sequential testing process described above, the phase testing will typically continue until the RMS phase deviation of each laser is minimized with respect to the average phase of the plurality of secondary laser signals. As shown in FIG. 13, the phase controller 72 can be operably connected to the control system 21 so as to sequentially dither the respective phases of the secondary laser signals via the plurality of phase modulators 27 disposed upstream of the lens elements 56. Alternatively, the beam combining means 54 of this embodiment can include a phase modulator array 58 as shown in FIG. 12 such that the respective phases of the collimated secondary laser signals can be dithered by adjusting the corresponding elements 60 of the phase modulator array.

Instead of monitoring the central spot, the beam combining means 54 of FIG. 13 can determine the off-axis intensity of the secondary laser signals which have been focused to a single point, such as by monitoring all of the light in the focal plane of the transform lens 74 with the exception of the central spot. As described above, the respective phase of each secondary laser signal can be sequentially dithered with the phase controller 72, such as with a plurality of phase modulators 27 disposed upstream of the lens elements 56 or with a phase modulator array 58 as shown in FIG. 12. The off-axis intensity can be monitored throughout the dithering process and the respective phases of the secondary laser signals can be controlled such that the off-axis intensity is minimized, thereby maximizing the corresponding on-axis intensity. By analyzing the off-axis intensity, the beam combining means of this embodiment is readily scalable to relative large laser arrays since any phase change will create a significant change in the off-axis intensity.

Instead of the time sequential testing process described above, the beam combining means 54 can employ a simultaneous frequency testing process in which a separate dither frequency is assigned to each secondary laser signal. As known to those skilled in the art, the respective phases of the secondary laser signals are tracked using phased locked loops according to a multi-dither process. The respective phases of the secondary laser signals can be adjusted based upon the error signals generated by the phase locked loops since each error signal is proportional to the phase of the respective secondary laser signal in comparison to the average phase of the ensemble of secondary laser signals.

As shown in FIG. 13, the beam combining means 54 of this embodiment can also optionally include a phase modulator array 80, such as a liquid crystal or electro-optic phase modulator array, to impose a predetermined wavefront on the secondary laser signals. For example, the predetermined wavefront imposed by the phase modulator array can be a phase conjugate wavefront which is designed to compensate or correct for undesirable phase perturbations introduced downstream by the atmosphere. In particular, for a beam combining means which creates a relatively flat phase front across the secondary laser signals entering the transform lens 74, the relative phase settings of the secondary laser signals must be the exact opposite, or the phase conjugate, of the respective phase settings of the phase modulator array. Thus, if the phase settings of the phase modulator array are set equal to the downstream phase perturbations, the secondary laser signals will have the desired conjugate wavefront to propagate through the perturbing medium. Thus, the phase modulator array can adaptively compensate for phase or amplitude perturbations introduced by the atmosphere in real time which could otherwise disperse the resulting laser beam.

The number of elements of the phase modulator array 80 defines the spatial resolution of the wavefront correction system. Thus, for optimum wavefront correction, the spatial resolution of the laser array must be at least as great as the spatial resolution of the downstream phase perturbations. In addition, the number of secondary laser signals is preferably at least as great as the number of elements of the phase modulator array.

While several exemplary methods and apparatus for modulating the respective phases of the plurality of secondary laser signals has been described above, the fiber optic laser system 10 can include beam combining means 54 which operate according to a variety of beam control methodologies without departing from the spirit and scope of the present invention. For example, the respective phases of the plurality of secondary laser signals can be modulated according to a multi-dither method, a time-division dithering method or a phase contrast method.

Due, at least in part, to the relatively high quality and high brightness of the laser output of the fiber optic laser system 10 of the present invention, the laser output can be applied to a non-linear crystal so as to produce the second, third or fourth harmonics of the laser output which also have relatively high quality. Accordingly, the fiber optic laser system can readily produce signals having derivative wavelengths.

Also due to the relatively high power, the relatively high quality and the adaptability of the laser output, the fiber optic laser system 10 of the present invention can be employed in a variety of applications, including laser communication systems and military systems, including laser weapons and ranging and remote sensing operations. The fiber optic laser is also adapted to perform various material processing applications including heat treating, cutting, welding, drilling, trimming, paint stripping, cleaning and coating application and removal. In addition, the fiber optic laser system of the present invention is particularly adapted for laser marking, the production of plasma on a variety of targets and applications requiring direct laser illumination, such as for medical applications. Further, the fiber optic laser system of the present invention can illuminate a variety of objects so as to be desirably employed in sensing, photography, holography and meteorology applications.

The fiber optic laser system 10 of the present invention can also produce a laser output having a specific wavelength which excites atomic and molecular transitions in target media by resonant absorption processes. For example, the fiber optic laser can excite the sodium D lines in a mesospheric layer so as to serve as an artificial guide star for active compensation of atmospheric performance degradation of ground-based telescopes and laser beam directors. The fiber optic laser can also selectively excite the isotopes of elements, such as uranium, for purposes of separation and purification. While a number of potential applications of the fiber optic laser are described herein, the fiber optic laser of the present invention can be employed in other applications without departing from the spirit and scope of the present invention.

Furthermore, the fiber optic laser system 10 of the present invention provides a modular system. In particular, both the distribution modules and the power amplification modules can be individually packaged along with appropriate means for providing electrical drive energy, such as a battery, and means, such as a heatsink, for removing or conducting away waste thermal energy. Thus, a fiber optic laser system having predetermined operating characteristics can be constructed by appropriately selecting and assembling one or more distribution modules and power amplification modules. In addition, the modular design of the fiber optic laser system provides for rapid reconfiguration of the system by inserting or removing modules as desired. In addition, repair and maintenance of the fiber optic laser system is simplified due to the modular design concept since malfunctioning modules can simply be removed and replaced without dismantling the entire fiber optic laser system. Moreover, the laser signal source 11, distribution modules 14a, amplification modules 30 and beam combining means 54 can be connected with fiber optic waveguides such that the various components of the fiber optic laser system can be remotely located and can be combined into a laser system capable of generating high power levels in a variety of mechanical configurations.

In the drawings and the specification, there has been set forth preferred embodiments of the invention and, although specific terms are employed, the terms are used in a generic and descriptive sense only and not for purpose of limitation, the scope of the invention being set forth in the following claims.

That which is claimed is:
1. A fiber optic laser system comprising:
   a master oscillator which generates a primary laser signal having a predetermined wavelength and a predetermined power level;
   amplification means, downstream of said master oscillator, for amplifying the primary laser signal, wherein said amplification means comprises an optical fiber amplifier for amplifying the primary laser signal during transmission through said optical fiber amplifier;
   distribution means, downstream of said master oscillator, for dividing the primary laser signal generated by said master oscillator into a plurality of secondary laser signals, wherein the secondary laser signals have a frequency and an amplitude which are related in a predetermined manner to the predetermined wavelength and the predetermined power level of the primary laser signal; and
   beam combining means, downstream of said distribution means, for combining the plurality of secondary laser signals into a laser output having an amplitude which is greater than the predetermined power level of the primary laser signal and a wavelength which equals or is derived from the predetermined wavelength of the primary laser signal to thereby produce a high intensity laser output.

2. A fiber optic laser system according to claim 1 wherein said distribution means comprises a signal power splitter, responsive to said optical fiber amplifier, for dividing the primary laser signal into the plurality of secondary laser signals.

3. A fiber optic laser system according to claim 1 wherein said distribution means further comprises a pump source for pumping said optical fiber amplifier such that the primary laser signal is amplified.

4. A fiber optic laser system according to claim 3 wherein said distribution means further comprises a monitor for individually detecting at least one of the plurality of secondary laser signals and a pump signal injected by said pump source to confirm that said distribution means is operating properly.

5. A fiber optic laser system according to claim 1 wherein said optical fiber amplifier comprises an optical fiber having a core doped with at least one rare earth element, the at least one rare earth element being selected from the group consisting of ytterbium, neodymium, praseodymium, erbium, holmium and thulium.

6. A fiber optic laser system according to claim 1 wherein said optical fiber amplifier amplifies signals transmitted therethrough having a wavelength within a predetermined range of wavelengths, and wherein the predetermined wavelength of the primary laser signal generated by said master oscillator is within the predetermined range of wavelengths.

7. A fiber optic laser system according to claim 1 further comprising a power amplification module, responsive to said distribution means, for further amplifying at least one of the secondary laser signals, said power amplification module comprising at least one optical fiber amplifier for amplifying the at least one secondary laser signal during transmission through said optical fiber amplifier.

8. A fiber optic laser system according to claim 7 wherein said optical fiber amplifier of said power amplification module comprises a dual core optical fiber comprising:
   an inner core doped with a rare earth element;
   an outer core surrounding said inner core; and
   a cladding layer surrounding said outer core.

9. A fiber optic laser system according to claim 1 wherein said beam combining means comprises a plurality of lens elements for collimating respective ones of the plurality of secondary laser signals and for filling a predetermined aperture.

10. A fiber optic laser system according to claim 9 wherein said plurality of lens elements is selected from the group consisting of graded index lens elements, binary optic lens elements and surface refraction lens elements.

11. A fiber optic laser system according to claim 1 wherein said beam combining means comprises:

a phase modulator array having a plurality of phase modulator elements for controllably adjusting the respective phases of the plurality of secondary laser signals, wherein each phase modulator element is associated with a respective one of the plurality of secondary laser signals;

detection means for detecting at least one predetermined characteristic of the plurality of secondary laser signals and for comparing the detected characteristic with a predetermined characteristic; and phase control means, downstream of said detection means, for providing phase control signals to said phase modulator array based upon the comparison of the detected characteristic to the predetermined characteristic, such that said plurality of phase modulator elements adjust the respective phases of the plurality of secondary laser signals such that the plurality of secondary laser signals have a predetermined phase relationship.

12. A fiber optic laser system according to claim 11 wherein said detection means comprises a detector array having a plurality of detector elements for comparing a respective one of the plurality of secondary laser signals to a reference signal having a predetermined phase.

13. A fiber optic laser system according to claim 11 wherein said plurality of phase modulator elements consist of a plurality of modulators selected from the group consisting of liquid crystal modulators, electro-optic phase modulators and in-line fiber optic phase modulators.

14. A fiber optic laser system according to claim 11 wherein said detection means compares the plurality of secondary laser signals to a plurality of respective reference signals, and wherein said beam combining means further comprises means for generating a reference signal comprising:

a reference laser source for producing a reference signal having a predetermined phase; and a phase modulator for controllably adjusting the phase of the reference signal generated by said reference signal source.

15. A fiber optic laser system according to claim 1 further comprising a plurality of phase modulators for controlling the phase of respective secondary laser signals relative to the primary laser signal, and wherein said beam combining means comprises:

a detector for detecting an intensity of the plurality of secondary laser signals; and phase control means, downstream of said detector, for providing phase control signals to said phase modulators based upon the detected intensity such that said plurality of phase modulators adjust the respective phases of the plurality of secondary laser signals such that the plurality of secondary laser signals have a predetermined phase relationship.

16. A fiber optic laser system according to claim 15 further comprising a transform lens for focusing the plurality of secondary laser signals to a central spot, wherein said detector detects the intensity of the central spot, and wherein said phase control means adjusts the respective phases of the plurality of secondary laser signals to maximize the intensity of the central spot.

17. A fiber optic laser system according to claim 15 further comprising a transform lens for focusing the plurality of secondary laser signals to a central spot in a focal plane, wherein said detector detects the intensity of light in the focal plane outside of the central spot, and wherein said phase control means adjusts the respective phases of the plurality of secondary laser signals to minimize the intensity of light in the focal plane outside of the central spot.

18. A fiber optic laser system according to claim 15 wherein said beam combining means further comprises a phase modulator array, upstream of said detector, for imposing a predetermined wavefront on the plurality of secondary laser signals to thereby compensate for signal perturbations introduced downstream of said beam combining means.

19. A fiber optic laser system according to claim 1 wherein said optical fiber amplifier introduces spurious signals as a result of scattering while amplifying the primary laser signal, and wherein said optical fiber amplifier of said amplification means includes a filter for selectively removing optical signals having wavelengths, different than the predetermined wavelength, to thereby reduce the spurious signals introduced by said optical fiber amplifier as a result of scattering.

20. A fiber optic laser system according to claim 1 further comprising means, downstream of said distribution means, for further dividing at least one secondary laser signal into a plurality of tertiary laser signals.

21. A fiber optic laser system comprising:

a master oscillator which generates a primary laser signal having a predetermined wavelength and a predetermined power level;

a distribution module, downstream of said master oscillator, for amplifying and dividing the primary laser signal generated by said master oscillator into a plurality of secondary laser signals, said distribution module comprising:

an optical fiber amplifier for receiving the primary laser signal from said master oscillator and for amplifying the primary laser signal during transmission through said optical fiber amplifier; and a coupler, downstream of said optical fiber amplifier, for dividing the amplified primary laser signal into the plurality of secondary laser signals; and a power amplification module, downstream of said distribution module, for further amplifying at least one of the secondary laser signals, said power amplification module comprising at least one optical fiber amplifier for amplifying the at least one secondary laser signal during transmission through said optical fiber amplifier to thereby produce a laser output having a power level greater than the predetermined power level of the primary laser signal.

22. A fiber optic laser system according to claim 21 wherein said optical fiber amplifier of said power amplification module comprises a dual core optical fiber comprising:

an inner core doped with a rare earth element;

an outer core surrounding said inner core; and a cladding layer surrounding said outer core.

23. A fiber optic laser system according to claim 22 wherein said power amplification module further comprises at least one pump source for pumping said optical fiber amplifier.

24. A fiber optic laser system according to claim 23 wherein said outer core has a predetermined cross-sectional size and shape, wherein said at least one pump source is comprised of a laser source adapted to emit a laser beam having a predetermined size and shape, the predetermined size and shape of the laser beam matching the predetermined cross-sectional size and shape of said outer core to thereby efficiently couple the pump signal to said outer core of said optical fiber amplifier.

25. A fiber optic laser system according to claim 23 wherein said power amplification module further comprises a plurality of distributed pump sources for pumping said optical fiber amplifier in a plurality of spaced-apart regions of said dual core optical fiber.

26. A fiber optic laser system according to claim 23 wherein said at least one optical fiber amplifier of said power amplification module comprises first and second serially connected optical fiber amplifiers, and wherein said at least one pump source is adapted to simultaneously pump both said first and second optical fiber amplifiers in opposite directions relative to the direction in which the secondary laser signals are transmitted therethrough.

27. A fiber optic laser system according to claim 23 wherein said at least one pump source comprises first and second pump sources adapted to produce respective pump signals having first and second polarization states, respectively, wherein the first and second polarization states are different, and wherein said power amplification module further comprises a polarizing beam combiner for combining the respective pump signals of said first and second pump sources to produce a combined pump signal having a mixed polarization, different than the first and second polarization states, and having a greater brightness than the respective brightness of either pump signal produced by said first and second pump sources.

28. A fiber optic laser system according to claim 23 wherein said at least one pump source comprises a plurality of pump sources adapted to produce respective pump signals having different wavelengths, and wherein said power amplification module further comprises a dichroic beam combiner for combining the respective pump signals of said plurality of pump sources to produce a combined pump signal having a mixed wavelength, different than the respective wavelengths of the individual pump sources and having a greater brightness than the respective brightness of the respective pump signals produced by said individual pump sources.

29. A fiber optic laser system according to claim 23 whereas said optical fiber amplifier of said power amplification module includes a filter for selectively removing optical signals having wavelengths, different than the predetermined wavelength, to thereby diminish signal generation by non-linear scattering effects.

30. A fiber optic laser system according to claim 21 further comprising beam combining means, responsive to said power amplification module, for combining the plurality of secondary laser signals, including the secondary laser signals which have been further amplified by said power amplification module, into the laser output.

31. A fiber optic laser system according to claim 30 wherein said beam combining means comprises a plurality of lens elements for collimating respective ones of the plurality of secondary laser signals and for filling a predetermined aperture.

32. A fiber optic laser system according to claim 32 wherein said beam combining means comprises:
a phase modulator array having a plurality of phase modulator elements for controllably adjusting the respective phases of the plurality of secondary laser signals, wherein each phase modulator element is associated with a respective one of the plurality of secondary laser signals;

a detector array having a plurality of detector elements for comparing a respective one of the plurality of secondary laser signals to a reference signal having a predetermined phase; and phase control means, responsive to said detector array, for providing phase control signals to said phase modulator array, such that said plurality of phase modulator elements adjust the respective phases of the plurality of secondary laser signals such that the plurality of secondary laser signals have a predetermined phase relationship to the predetermined phase of the reference signal.

33. A fiber optic laser system according to claim 30 further comprising a plurality of phase modulators for controlling the phase of respective secondary laser signals relative to the primary laser signal, and wherein said beam combining means comprises:
a detector for detecting an intensity of the plurality of secondary laser signals; and phase control means, responsive to said detector, for providing phase control signals to said phase modulators based upon the detected intensity such that said plurality of phase modulators adjust the respective phases of the plurality of secondary laser signals such that the plurality of secondary laser signals have a predetermined phase relationship.

34. A fiber optic laser system according to claim 33 wherein said beam combining means further comprises a phase modulator array, upstream of said detector, for imposing a predetermined wavefront on the plurality of secondary laser signals to thereby compensate for signal perturbations introduced downstream of said beam combining means.

35. A fiber optic laser system according to claim 21 further comprising a cascaded distribution module, downstream of said distribution module, for further dividing at least one secondary laser signal into a plurality of tertiary laser signals.

36. A method of producing a high power laser output comprising the steps of:
generating a primary laser signal having a predetermined wavelength and a predetermined power level;

transmitting the primary laser signal through an optical fiber amplifier, said transmitting step comprising the step of amplifying the primary laser signal with the optical fiber amplifier;

dividing the amplified primary laser signal into a plurality of secondary laser signals; and combining the plurality of secondary laser signals into a laser output having a power level greater than the predetermined power level of the primary laser signal.

37. A method according to claim 36 wherein said amplifying step comprises the step of pumping the optical fiber amplifier with pump signals having a predetermined wavelength.

38. A method according to claim 37 wherein said pumping step comprises the step of pumping the optical fiber amplifier at a plurality of spaced-apart regions.

39. A method according to claim 37 wherein said pumping step comprises the steps of:
providing first and second pump signals having first and second polarizations, respectively;

combining the first and second pump signals into a composite pump signal having a mixed polarization, different than the first and second polarizations.

40. A method according to claim 37 wherein said pumping step comprises the steps of:

providing first and second pump signals having first and second wavelengths, respectively;

combining the first and second pump signals into a composite pump signal having a mixed wavelength.

41. A method according to claim 37 further comprising the step of monitoring the amplification of primary laser signals by individually detecting at least one secondary laser signal and at least a portion of the pump signals.

42. A method according to claim 36 further comprising the step of further amplifying at least one of the secondary laser signals with a second optical fiber amplifier during transmission of the at least one secondary laser signal therethrough.

43. A method according to claim 36 wherein said combining step comprises the step of collimating the plurality of secondary laser signals.

44. A method according to claim 43 wherein said combining step further comprises the step of filling a predetermined aperture with the plurality of collimated secondary laser signals.

45. A method according to claim 36 wherein said combining step further comprises the step of modulating the respective phases of the plurality of secondary laser signals to thereby create a laser output having a predetermined phase relationship.

46. A method according to claim 45 wherein said modulating step comprises the steps of:

individually comparing predetermined characteristics of the plurality of secondary laser signals with a predetermined reference characteristic, to thereby determine the difference therebetween;

modulating the respective phases of the plurality of secondary laser signals, based upon the differences between the predetermined characteristic of the plurality of secondary laser signals and the predetermined reference characteristic as determined during said comparing step, to thereby create a predetermined phase relationship; and combining the plurality of laser signals, following said modulating step, into a laser output having a predetermined phase profile.

47. A method according to claim 46 wherein said step of individually comparing comprises the step of individually comparing the plurality of secondary laser signals with respective ones of a plurality of reference signals each having a respective predetermined phase, to thereby determine the respective phase differences therebetween.

48. A method according to claim 45 wherein said modulating step comprises the steps of:

focusing the plurality of secondary laser signals to a central spot;

determining the intensity of the central spot;

modulating the respective phases of the plurality of secondary laser signals in order to maximize the intensity of the central spot; and combining the plurality of secondary laser signals, following said modulating step, into a laser output having a predetermined phase profile.

49. A method according to claim 45 wherein said modulating step comprises the steps of:

focusing the plurality of secondary laser signals to a central spot in a focal plane;

determining the intensity of light in the focal plane outside of the central spot;

modulating the respective phases of the plurality of secondary laser signals in order to maximize the intensity of light in the focal plane outside of the central spot; and combining the plurality of secondary laser signals, following said modulating step, into a laser output having a predetermined phase profile.

50. A method according to claim 45 further comprising the step of imposing a predetermined wavefront on the plurality of secondary laser signals, following said modulating step, to thereby compensate for subsequent signal perturbations.

51. A method according to claim 36 further comprising the steps of:

further amplifying at least one of the secondary laser signals; and further dividing the further amplified secondary laser signal into a plurality of tertiary laser signals prior to said combining step.

52. A method according to claim 36 wherein said transmitting step further comprises the step of filtering signals having a wavelength outside of a predetermined range of wavelengths centered about the predetermined wavelength of the primary laser signal to thereby remove spurious signals introduced by non-linear scattering within the optical fiber amplifier.

53. A fiber optic laser system comprising:

a master oscillator which generates a primary laser signal having a predetermined wavelength and a predetermined power level;

distribution means, downstream of said master oscillator, for dividing the primary laser signal generated by said master oscillator into a plurality of secondary laser signals;

power amplification means for amplifying at least one of the secondary laser signals, said power amplification means comprising at least one optical fiber amplifier for amplifying the at least one secondary laser signal during transmission through said optical fiber amplifier; and beam combining means, downstream of said power amplification means, for coherently combining the plurality of secondary laser signals into a laser output having an amplitude which is greater than the predetermined power level of the primary laser signal and a wavelength which equals or is derived from the predetermined wavelength of the primary laser signal to thereby produce a high intensity laser output.

54. A fiber optic laser system according to claim 53 further comprising amplification means, downstream of said master oscillator, for amplifying the primary laser signal prior to division of the primary laser signal into the plurality of secondary laser signals.

55. A fiber optic laser system according to claim 53 wherein said power amplification means further comprises a pump source for pumping said optical fiber amplifier such that the primary laser signal is amplified.

56. A fiber optic laser system according to claim 55 wherein said power amplification means further comprises a monitor for individually detecting at least one of the plurality of secondary laser signals and a pump signal injected by said pump source to confirm that said power amplification means is operating properly.

57. A fiber optic laser system according to claim 53 wherein said beam combining means comprises a plurality of lens elements for collimating respective ones of the plurality of secondary laser signals and for filling a predetermined aperture.

58. A fiber optic laser system according to claim 53 further comprising a plurality of phase modulators for controlling the phase of respective secondary laser signals relative to the primary laser signal, and wherein said beam combining means comprises:

a detector for detecting an intensity of the plurality of secondary laser signals; and phase control means, downstream of said detector, for providing phase control signals to said phase modulators based upon the detected intensity such that said plurality of phase modulators adjust the respective phases of the plurality of secondary laser signals such that the plurality of secondary laser signals have a predetermined phase relationship.

59. A fiber optic laser system according to claim 53 further comprising means, downstream of said distribution means, for further dividing at least one secondary laser signal into a plurality of tertiary laser signals.

60. A method of producing a high power laser output comprising the steps of:

generating a primary laser signal having a predetermined wavelength and a predetermined power level;

dividing the primary laser signal into a plurality of secondary laser signals having a frequency and an amplitude which are related in a predetermined manner to the predetermined wavelength and the predetermined power level of the primary laser signal;

transmitting the secondary laser signals through respective optical fiber amplifiers, said transmitting step comprising the step of amplifying the secondary laser signals with the respective optical fiber amplifiers; and coherently combining the plurality of secondary laser signals into a laser output having a power level greater than the predetermined power level of the primary laser signal.

61. A method according to claim 60 wherein said amplifying step comprises the step of pumping the respective optical fiber amplifiers with pump signals having a predetermined wavelength.

62. A method according to claim 61 further comprising the step of monitoring the amplification of the secondary laser signals by individually detecting at least one secondary laser signal and at least a portion of the pump signals.

63. A method according to claim 60 further comprising the step of amplifying the primary laser signal prior to said dividing step.

64. A method according to claim 60 wherein said combining step further comprises the step of modulating the respective phases of the plurality of secondary laser signals to thereby create a laser output having a predetermined phase relationship.

65. A method according to claim 60 further comprising the step of further dividing at least one secondary laser signal into a plurality of tertiary laser signals prior to said combining step.

* * * * *